United States Patent
Laroche et al.

(10) Patent No.: US 12,267,488 B2
(45) Date of Patent: Apr. 1, 2025

(54) HIGH LEVEL SYNTAX FOR VIDEO CODING AND DECODING

(71) Applicant: CANON KABUSHIKI KAISHA, Tokyo (JP)

(72) Inventors: Guillaume Laroche, Saint Aubin d'Aubigné (FR); Naël Ouedraogo, Val d'Anast (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/787,085

(22) PCT Filed: Dec. 18, 2020

(86) PCT No.: PCT/EP2020/087248
§ 371 (c)(1),
(2) Date: Jun. 17, 2022

(87) PCT Pub. No.: WO2021/123326
PCT Pub. Date: Jun. 24, 2021

(65) Prior Publication Data
US 2023/0065112 A1    Mar. 2, 2023

(30) Foreign Application Priority Data
Dec. 20, 2019  (GB) ..................................... 1919033

(51) Int. Cl.
*H04N 19/107* (2014.01)
*H04N 19/172* (2014.01)
(Continued)

(52) U.S. Cl.
CPC ......... *H04N 19/107* (2014.11); *H04N 19/172* (2014.11); *H04N 19/174* (2014.11);
(Continued)

(58) Field of Classification Search
CPC .......................... H04N 19/172; H04N 19/174
See application file for complete search history.

(56) References Cited

U.S. PATENT DOCUMENTS 11,902,584 B2 *  2/2024  Li .................... H04N 19/159
2021/0136419 A1 *  5/2021  Hsiang ............... H04N 19/174
(Continued)

FOREIGN PATENT DOCUMENTS

| CN | 104641648 A | 5/2015 |
| CN | 105612745 A | 5/2016 |

(Continued)

OTHER PUBLICATIONS

P. Topiwala, M. Krishnan, & W. Dai, "Performance comparison of VVC, AV1, and EVC", 11137 Proc. SPIE 15-1-15-12 (Sep. 6, 2019) (Year: 2019).*

(Continued)

*Primary Examiner* — David N Werner
(74) *Attorney, Agent, or Firm* — Canon U.S.A., Inc. IP Division

(57) ABSTRACT

A method of decoding video data from a bitstream, the bitstream comprising video data corresponding to multiple slices, wherein the video bitstream comprises a picture header; the method includes determining a coding mode for at least one slice; determining a set of syntax elements to be used for said coding mode from said picture header; and decoding said at least one slice using said determined syntax elements.

9 Claims, 10 Drawing Sheets

(51) Int. Cl.
*H04N 19/174* (2014.01)
*H04N 19/184* (2014.01)
*H04N 19/46* (2014.01)
*H04N 19/70* (2014.01)

(52) U.S. Cl.
CPC ........... *H04N 19/184* (2014.11); *H04N 19/46* (2014.11); *H04N 19/70* (2014.11)

(56) References Cited

U.S. PATENT DOCUMENTS

| | | | |
|---|---|---|---|
| 2021/0195247 A1* | 6/2021 | Li | H04N 19/70 |
| 2022/0116648 A1* | 4/2022 | Sethuraman | H04N 19/109 |
| 2022/0217380 A1* | 7/2022 | Hendry | H04N 19/46 |
| 2022/0353536 A1* | 11/2022 | Samuelsson | H04N 19/174 |
| 2023/0076537 A1* | 3/2023 | Pettersson | H04N 19/174 |
| 2024/0089483 A1* | 3/2024 | Zhang | H04N 19/46 |

FOREIGN PATENT DOCUMENTS

| | | | |
|---|---|---|---|
| CN | 108781296 A | | 11/2018 |
| EP | 3854100 A1 | | 7/2021 |
| EP | 3939317 A1 | | 1/2022 |
| EP | 4035396 A1 | | 8/2022 |
| EP | 4042680 A1 | | 8/2022 |
| EP | 4044598 A1 | | 8/2022 |
| EP | 4078946 A1 | | 10/2022 |
| JP | 2015080002 A | | 4/2015 |
| JP | 2022525961 A | | 5/2022 |
| WO | 2014/002375 A1 | | 1/2014 |
| WO | 2021/127365 A1 | | 6/2021 |

OTHER PUBLICATIONS

JVET Document P0239, "AHG17: Picture Header" (Oct. 1, 2019) (Year: 2019).*

JVET Document P2001, "Versatile Video Coding (Draft 7)" (Nov. 14, 2019) (excerpts) (Year: 2019).*

Bross, et al., Versatile Video Coding (Draft 6), Joint Video Experts Team (JVET) of ITU-T SG 16 WP 3 and ISO/IEC JTC1/SC29/WG11, 15th Meeting, Jul. 3-12, 2019, Gothenburg, SE, Doc. No. JVET-O2001-vE, XP30216307.

Hendry, et al., AHGI7: On Access Unit Delimiter and Picture Header, Joint Video Experts Team (JVET) of ITU-T SG 16 WP 3 and ISO/IEC JTC1/SC29/WG11, 16th Meeting, Oct. 1-11, 2019, Geneva, CH, Doc. No. P0120-v1, XP30216308.

Wan, et al. AHG17:Picture Header, Joint Video Experts Team (JVET) of ITU-T SG 16 WP 3 and ISO/IEC JTC1/SC29/WG11, 16th Meeting, Oct. 1-11, 2019, Geneva, CH, Doc. No. JVET-P0239-v1, XP30216647.

U.S. Appl. No. 62/950,453, filed Dec. 19, 2019.

Benjamin Bross, et al., Versatile Video Coding (Draft 7), Joint Video Experts Team (JVET) of ITU-T SG 16 WP3 and ISO/IEC JTC 1/SC 29/WG 11, 16th Meeting, Geneva, CH, Oct. 2019, Doc. No. JVET-P2001-vE.

* cited by examiner

HIGH LEVEL SYNTAX FOR VIDEO CODING AND DECODING

CROSS REFERENCE TO RELATED APPLICATION

This application is the National Phase application of PCT Application No. PCT/EP2020/087248, filed on Dec. 18, 2020. This application claims the benefit under 35 U.S.C. § 119(a)-(d) of United Kingdom Patent Application No. 1919033.9, filed on Dec. 20, 2019. The above-cited patent applications are incorporated herein by reference in their entirety.

FIELD OF INVENTION

The present invention relates to video coding and decoding, and in particular the high level syntax used for video coding and decoding.

BACKGROUND

Recently, the Joint Video Experts Team (JVET), a collaborative team formed by MPEG and ITU-T Study Group 16's VCEG, commenced work on a new video coding standard referred to as Versatile Video Coding (VVC). The goal of VVC is to provide significant improvements in compression performance over the existing HEVC standard (i.e., typically twice as much as before) and to be completed in 2020. The main target applications and services include—but not limited to—360-degree and high-dynamic-range (HDR) videos. In total, JVET evaluated responses from 32 organizations using formal subjective tests conducted by independent test labs. Some proposals demonstrated compression efficiency gains of typically 40% or more when compared to using HEVC. Particular effectiveness was shown on ultra-high definition (UHD) video test material. Thus, we may expect compression efficiency gains well-beyond the targeted 50% for the final standard.

The JVET exploration model (JEM) uses all the HEVC tools and has introduced a number of new tools. These changes have necessitated a change to the structure of the bitstream, and in particular to the high-level syntax which can have a impact on the overall bitrate of the bitstream.

One significant change to the high-level syntax is the introduction of a 'picture header' into the bitstream. A picture header is a header specifying syntax elements to be used in decoding each slice in a specific picture (or frame). The picture header is thus placed before the data relating to the slices in the bitstream, the slices each having their own 'slice header'. This structure is described in more detail below with reference to FIG. 6.

Document JVET-P0239 of the 16th Meeting: Geneva, CH, 1-11 Oct. 2019, titled 'AHG17: Picture Header' proposed the introduction of a mandatory picture header into VVC, and this was adopted as Versatile Video Coding (Draft 7), uploaded as document JVET_P2001. However, while this structure provides flexibility in the use of all the VVC tools, there is an increase in the amount of syntax elements signalled in the bitstream which affects the bitrate of transmission—in particular for low bitrate instances.

Accordingly, a solution to at least one of the aforementioned problems is desirable.

Broadly, the inventors have realised that the flexibility in-built into the recently-adopted high-level syntax is only rarely used and as such unnecessarily increases the bitrate. In particular, most pictures only comprise slices using one slice coding mode (e.g. Inter or Intra) whereas the high-level syntax allows for slices of different type in each picture. The present invention relates to exploiting the fact that most pictures only use slices of one coding type, and as such the bitrate can be reduced.

Optional features which re-introduce the flexibility of multiple coding types within a single picture are also considered. Specific syntax elements and/or additional constraint of syntax elements are added to reduce the bitrate compared the recently-adopted high-level syntax. These 'add-on' features may increase the bitrate, but as they would be rarely used, the average bitrate for a given video sequence will be reduced compared to the prior art.

The invention proposes a modification of the picture header signaling to avoid extra signaling of some picture header parameters not needed when the whole picture contains only one slice type (I, P, B). In particular, the parameters related to delta QP signaling for Inter and Intra are merged into single parameters. The override flag for partitioning parameters is changed into two override flags: one for inter and one for intra slices. Moreover, an override flag is added for motion information parameters in inter slices. These modifications offer almost the same flexibility compared to the current design, yet it increases the coding efficiency.

In one aspect of the invention, the decoder only has to decode one set of syntax elements from the picture header, this set of syntax elements is defined by a slice coding mode (e.g. INTER or INTRA) for the picture. Alternatively, the syntax elements in the picture header are agnostic to the coding mode and include a set of merged syntax elements. In such a way, the bitrate is reduced as unnecessary syntax elements can be skipped by the decoder.

According to one aspect of the present invention, there is provided a method of decoding video data from a bitstream, the bitstream comprising video data corresponding to one or more slices, wherein a picture comprises one or more slices; and wherein the video bitstream comprises a picture header; the method comprising: determining whether the one or more slices in the picture uses a single coding mode; determining a set of syntax elements to be used for said single coding mode from said picture header; and decoding said one or more slices using said determined syntax elements.

Optionally, determining the coding mode for said one or more slices is in dependence on at least one syntax element in said picture header.

Optionally, the single coding mode is one of INTER or INTRA.

Optionally, the single coding mode is INTER.

Optionally, the INTER coding mode is one of INTER B or INTER P.

Optionally, determining a set of syntax elements to be used for said single coding mode comprises enabling and/or disabling at least one syntax element in a picture header.

Optionally, determining a set of syntax elements to be used for said single coding mode comprises enabling and/or disabling at least one syntax element in a slice header.

Optionally, determining the coding type based on the value of an AU delimiter.

Optionally, determining a coding mode comprises decoding one or more override flags.

Optionally, said one or more override flags comprise a first flag indicating whether INTER mode is used and a second flag indicating whether INTRA mode is used.

In an aspect of the invention, there is provided a method of decoding video data from a bitstream, the bitstream comprising video data corresponding to one or more slices, wherein a picture comprises one or more slices; and wherein the video bitstream comprises a picture header; the method comprising: determining a coding mode for the one or more slices in the picture; determining a set of syntax elements to be used for said coding mode from said picture header; and decoding said one or more slices using said determined syntax elements.

In an aspect of the invention, there is provided a method of encoding video data into a bitstream, the bitstream comprising video data corresponding to one or more slices, wherein a picture comprises one or more slices; and wherein the video bitstream comprises a picture header; the method comprising: defining a single coding mode for said at least one slice in the picture; encoding a set of syntax elements to be used for said single coding mode into said picture header; and encoding said one or more slices using said determined syntax elements.

In an aspect of the invention, there is provided a method of encoding video data into a bitstream, the bitstream comprising video data corresponding to one or more slices, wherein a picture comprises one or more slices; and wherein the video bitstream comprises a picture header; the method comprising: determining a coding mode for the one or more slices in the picture; determining a set of syntax elements to be used for said coding mode into said picture header; and encoding said one or more slices using said determined syntax elements.

Optionally, the coding mode is INTER, and encoding said picture header comprises encoding INTER syntax elements in the picture header.

Optionally, the coding mode is INTRA, and encoding said picture header comprises encoding INTRA syntax elements in the picture header.

In another aspect of the invention, there is provided a decoder adapted to decode a bitstream by carrying out the method according to the above described method of decoding aspect.

In another aspect of the invention, there is provided an encoder adapted to encode a bitstream by carrying out the method of the above described method of encoding aspect.

According to one aspect of the present invention there is provided a method of decoding video data from a bitstream, the bitstream comprising video data corresponding to multiple slices, wherein the video bitstream comprises a picture header; the method comprising: determining a coding mode for at least one slice; determining a set of syntax elements to be used for said coding mode from said picture header; and decoding said at least one slice using said determined syntax elements.

This allows for a reduction in bitrate and thus an overall more efficient decoding. Optionally, determining a coding mode for at least one slice is in dependence on a syntax element in said picture header.

Optionally, the coding mode is one of INTER or INTRA.

For flexibility, the coding mode is one of INTER, INTRA or a combination of INTER and INTRA.

For additional flexibility, the INTER coding mode is one of INTER B or INTER P.

Optionally, determining a set of syntax elements specific to said coding mode comprises enabling and/or disabling at least one syntax element in a picture header.

Optionally, determining a set of syntax elements specific to said coding mode comprises enabling and/or disabling at least one syntax element in a slice header.

Optionally, the method further comprises inferring a value of an AU delimiter based on said determined coding type.

Optionally, said inferring said value of the AU delimiter is performed if the stream is determined to contain only one layer.

According to another aspect of the present invention there is provided a method of decoding video data from a bitstream, the bitstream comprising video data corresponding to multiple slices, wherein the video bitstream comprises a picture header; the method comprising: determining whether all slices in a picture use a same coding mode; if said determining is true, decoding the picture using said syntax elements from said picture header.

According to another aspect of the present invention there is provided a method of decoding video data from a bitstream, the bitstream comprising video data corresponding to multiple slices, wherein the video bitstream comprises a picture header; the method comprising: decoding the picture using said syntax elements from said picture header; wherein all syntax elements correspond to the same slice coding mode These aspects reduce the rate in relation to the header, in particular for pictures which only contain Inter slices (which is the majority of pictures in many video sequences).

Optionally, if said determining is not true, Intra coding parameters for a Intra slice in said picture are inferred from a corresponding Inter syntax element in said picture header.

Optionally, said Intra syntax element is limited to the value of a corresponding Inter value.

Optionally, the method further comprises predicting a syntax element for said slice based on the value of a previous syntax element.

Optionally, determining a coding mode for at least one slice is dependent on syntax element in a header different to the picture header.

In one example, said header different to the picture header is a sequence header.

In another example, said header different to the picture header is an AUD NAL unit.

In one example, said determined coding mode is INTER. In another example said determined coding mode is INTRA.

Optionally, determining a coding mode comprises decoding one or more override flags.

Optionally, said one or more override flags are in a higher-level header than the picture header.

According to another aspect of the present invention there is provided a method of decoding video data from a bitstream, the bitstream comprising video data corresponding to multiple slices, wherein the video bitstream comprises a picture header; the method comprising: decoding one or more override flags; and decoding coding-specific syntax elements from said picture header in dependence on said one or more override flags; wherein said one or more override flags are in a higher-level header than the picture header.

This aspect provides the advantage of rate reduction, with additional flexibility in being able to override the default case.

Optionally, said higher-level header is the SPS or PPS.

Optionally, the method further comprises decoding two override flags from the picture header prior to coding-dependent syntax elements, the first override flag indicating Inter elements are overridden, and the second override flag indicating Intra elements are overridden.

Optionally, said syntax elements to be used for said determined coding mode are agnostic to the coding mode.

According to another aspect of the present invention there is provided a method of decoding video data from a bitstream, the bitstream comprising video data corresponding to multiple slices; wherein the video bitstream comprises a picture header; wherein said picture header only comprises syntax elements agnostic to coding mode; and decoding each slice in said picture using said syntax elements.

This aspect provides a rate reduction by reducing the number of redundant syntax elements in the picture header.

Optionally, the method further comprises determining syntax elements specific to said determined coding mode from a header different to said picture header.

Optionally, said header different to said picture header is a slice header.

For flexibility, both INTER and INTRA syntax elements may be provided in said slice header.

Optionally, the method further comprises decoding an override flag, said override flag determining whether or not to decode a coding-specific syntax element from a slice header.

Optionally, said syntax elements in said slice header have a value limited to an equivalent syntax element in the picture header.

Optionally, the method further comprises predicting one or more syntax elements in said slice header based on the value of a previous syntax element in said slice header.

According to another aspect of the present invention there is provided a method of encoding video data into a bitstream, the bitstream comprising video data corresponding to multiple slices, wherein the video bitstream comprises a picture header; the method comprising: defining a coding mode for at least one slice; encoding a set of syntax elements to be used for said coding mode from said picture header; and encoding said at least one slice using said determined syntax elements.

According to another aspect of the present invention there is provided a method of encoding video data into a bitstream, the bitstream comprising video data corresponding to multiple slices, wherein one or more slices comprise a picture; wherein the video bitstream comprises a picture header; the method comprising: defining a coding mode for said picture; encoding a syntax element into said picture header; wherein the value of said syntax element is dependent on said defined coding mode.

According to another aspect of the present invention there is provided a method of encoding video data into a bitstream, the bitstream comprising video data corresponding to multiple slices, wherein one or more slices comprise a picture; wherein the video bitstream comprises a picture header; the method comprising: defining a coding mode for all the slices within said picture; encoding said picture header with syntax elements in dependence on said defined coding mode.

According to another aspect of the present invention there is provided a method of encoding video data into a bitstream, the bitstream comprising video data corresponding to multiple slices, wherein the video bitstream comprises a picture header; the method comprising: encoding the picture using said syntax elements from said picture header; wherein all syntax elements correspond to the same slice coding mode Optionally, said coding mode is Inter, and encoding said picture header comprises encoding Inter syntax elements in the picture header.

Alternatively, said coding mode is Intra, and encoding said picture header comprises encoding Intra syntax elements in the picture header.

Optionally, the method further comprises encoding Inter syntax elements into the picture header and Intra syntax elements into a slice header if said defined coding mode is Intra.

According to another aspect of the present invention there is provided a method of encoding video data into a bitstream, the bitstream comprising video data corresponding to multiple slices, wherein the video bitstream comprises a picture header; the method comprising: encoding one or more override flags; and encoding coding-specific syntax elements into said picture header in dependence on said one or more override flags; wherein said one or more override flags are in a higher-level header than the picture header.

These encoding methods enable more efficient decoding as discussed above. In some instances the encoding is less complex as fewer syntax elements are encoded into the respective headers and/or there is less redundancy in the bitstream.

Yet further aspects of the present invention relate to a decoder and an encoder adapted to perform the preceding method of decoding and method of encoding aspects respectively Yet further aspects of the present invention relate to a program when executed by a computer or processor, causes the computer or processor to carry out the method of any one of the preceding method aspects of the invention. The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

Further features of the invention are characterised by the other independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

Reference will now be made, by way of example, to the accompanying drawings, in which.

DETAILED DESCRIPTION

Figure 1:
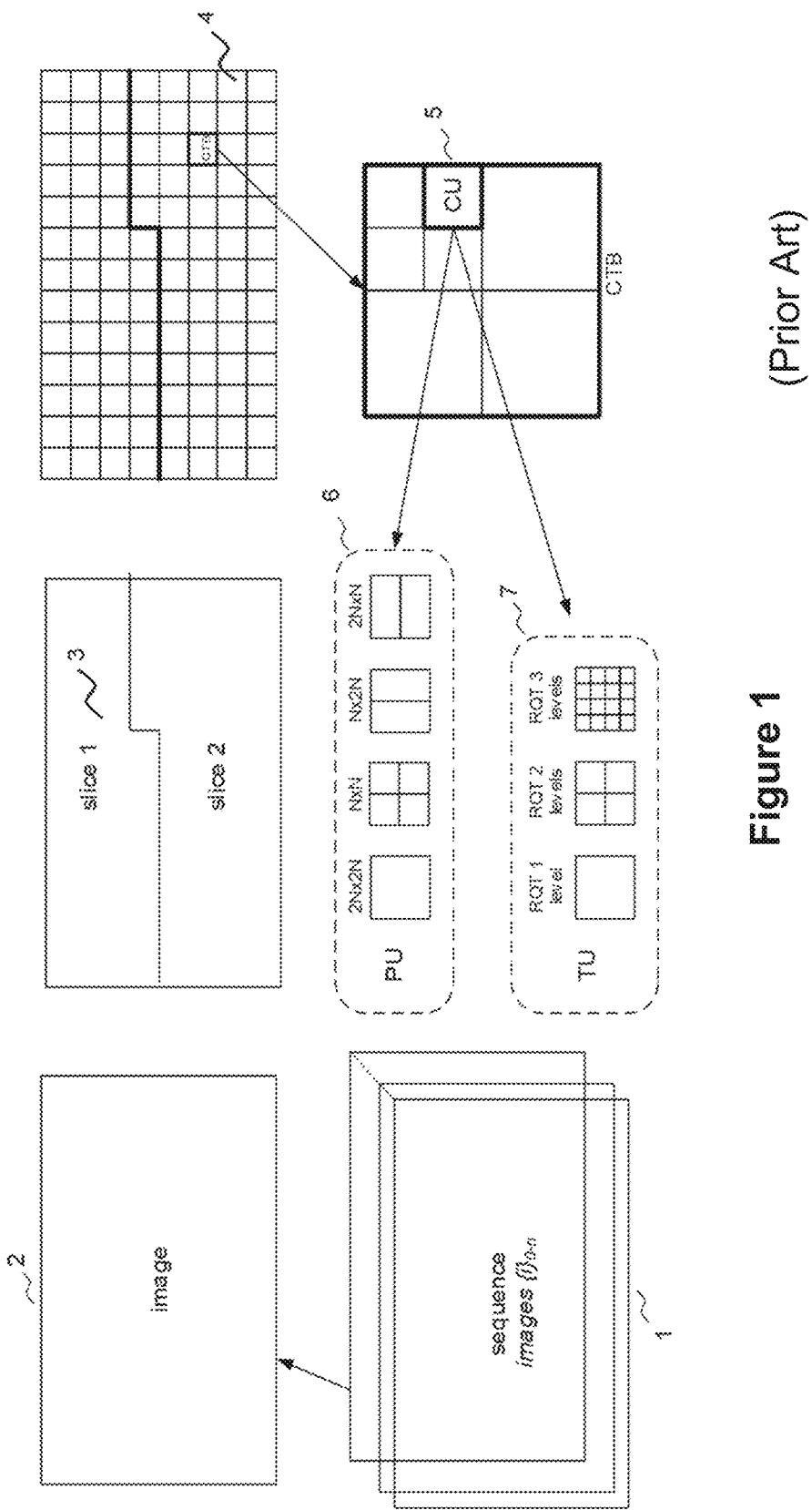
FIG. 1 is a diagram for use in explaining a coding structure used in HEVC and VVC.

FIG. 1 relates to a coding structure used in the High Efficiency Video Coding (HEVC) video standard. A video sequence 1 is made up of a succession of digital images i. Each such digital image is represented by one or more matrices. The matrix coefficients represent pixels.

An image 2 of the sequence may be divided into slices 3. A slice may in some instances constitute an entire image. These slices are divided into non-overlapping Coding Tree Units (CTUs). A Coding Tree Unit (CTU) is the basic processing unit of the High Efficiency Video Coding (HEVC) video standard and conceptually corresponds in structure to macroblock units that were used in several previous video standards. A CTU is also sometimes referred to as a Largest Coding Unit (LCU). A CTU has luma and chroma component parts, each of which component parts is called a Coding Tree Block (CTB). These different colour components are not shown in FIG. 1.

A CTU is generally of size 64 pixels×64 pixels. Each CTU may in turn be iteratively divided into smaller variable-size Coding Units (CUs) 5 using a quadtree decomposition.

Coding units are the elementary coding elements and are constituted by two kinds of sub-unit called a Prediction Unit (PU) and a Transform Unit (TU). The maximum size of a PU or TU is equal to the CU size. A Prediction Unit corresponds to the partition of the CU for prediction of pixels values. Various different partitions of a CU into PUs are possible as shown by 606 including a partition into 4 square PUs and two different partitions into 2 rectangular PUs. A Transform Unit is an elementary unit that is subjected to spatial transformation using DCT. A CU can be partitioned into TUs based on a quadtree representation 607.

Each slice is embedded in one Network Abstraction Layer (NAL) unit. In addition, the coding parameters of the video sequence are stored in dedicated NAL units called parameter sets. In HEVC and H.264/AVC two kinds of parameter sets NAL units are employed: first, a Sequence Parameter Set (SPS) NAL unit that gathers all parameters that are unchanged during the whole video sequence. Typically, it handles the coding profile, the size of the video frames and other parameters. Secondly, a Picture Parameter Set (PPS) NAL unit includes parameters that may change from one image (or frame) to another of a sequence. HEVC also includes a Video Parameter Set (VPS) NAL unit which contains parameters describing the overall structure of the bitstream. The VPS is a new type of parameter set defined in HEVC, and applies to all of the layers of a bitstream. A layer may contain multiple temporal sub-layers, and all version 1 bitstreams are restricted to a single layer. HEVC has certain layered extensions for scalability and multiview and these will enable multiple layers, with a backwards compatible version 1 base layer.

Figure 2:
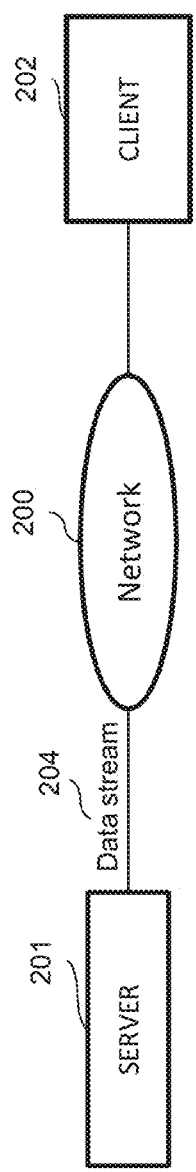
FIG. 2 is a block diagram schematically illustrating a data communication system in which one or more embodiments of the invention may be implemented.

FIG. 2 illustrates a data communication system in which one or more embodiments of the invention may be implemented. The data communication system comprises a transmission device, in this case a server 201, which is operable to transmit data packets of a data stream to a receiving device, in this case a client terminal 202, via a data communication network 200. The data communication network 200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 201 sends the same data content to multiple clients.

The data stream 204 provided by the server 201 may be composed of multimedia data representing video and audio data. Audio and video data streams may, in some embodiments of the invention, be captured by the server 201 using a microphone and a camera respectively. In some embodiments data streams may be stored on the server 201 or received by the server 201 from another data provider, or generated at the server 201. The server 201 is provided with an encoder for encoding video and audio streams in particular to provide a compressed bitstream for transmission that is a more compact representation of the data presented as input to the encoder. In order to obtain a better ratio of the quality of transmitted data to quantity of transmitted data, the compression of the video data may be for example in accordance with the HEVC format or H.264/AVC format.

The client 202 receives the transmitted bitstream and decodes the reconstructed bitstream to reproduce video images on a display device and the audio data by a loud speaker.

Although a streaming scenario is considered in the example of FIG. 2, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 3:
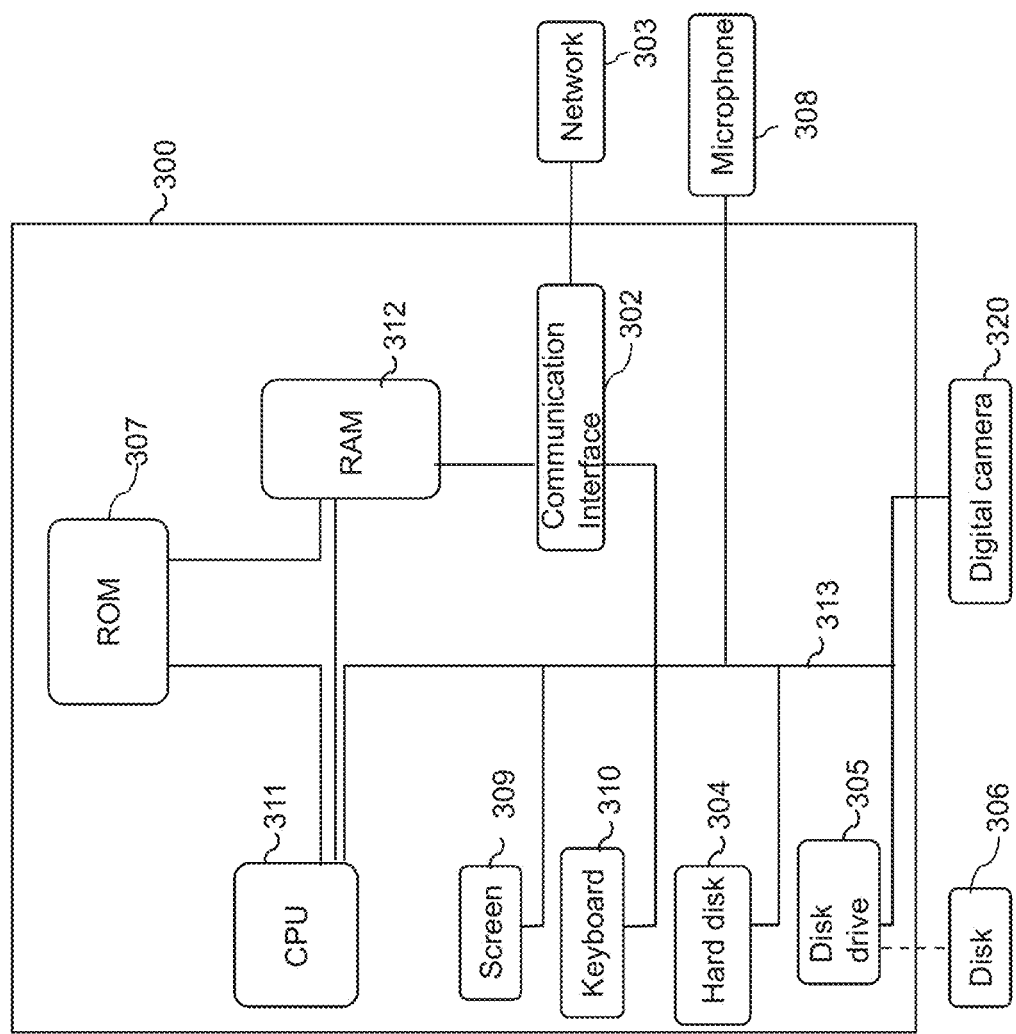
FIG. 3 is a block diagram illustrating components of a processing device in which one or more embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:

- a central processing unit 311, such as a microprocessor, denoted CPU;
- a read only memory 306, denoted ROM, for storing computer programs for implementing the invention;
- a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 302 connected to a communication network 303 over which digital data to be processed are transmitted or received Optionally, the apparatus 300 may also include the following components:

- a data storage means 304 such as a hard disk, for storing computer programs for implementing methods of one or more embodiments of the invention and data used or produced during the implementation of one or more embodiments of the invention;
- a disk drive 305 for a disk 306, the disk drive being adapted to read data from the disk 306 or to write data onto said disk;

a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 306, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 306, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
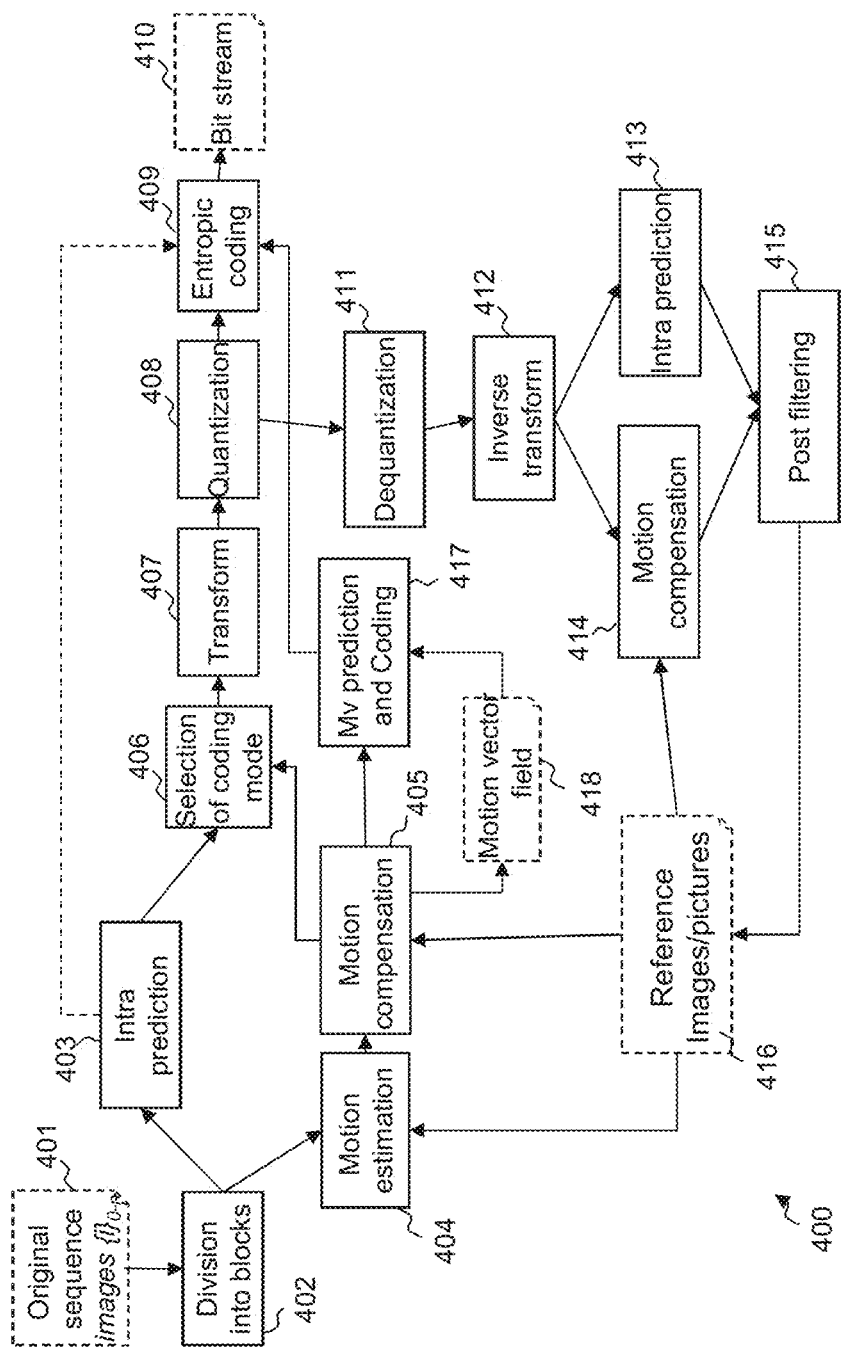
FIG. 4 is a flow chart illustrating steps of an encoding method according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 401 is received as an input by the encoder 400. Each digital image is represented by a set of samples, known as pixels.

A bitstream 410 is output by the encoder 400 after implementation of the encoding process. The bitstream 410 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements an Intra prediction process, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly, a reference image from among a set of reference images 416 is selected, and a portion of the reference image, also called reference area or image portion, which is the closest area to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated by a motion vector.

Thus, in both cases (spatial and temporal prediction), a residual is computed by subtracting the prediction from the original block.

In the INTRA prediction implemented by module 403, a prediction direction is encoded. In the temporal prediction, at least one motion vector is encoded. In the Inter prediction implemented by modules 404, 405, 416, 418, 417, at least one motion vector or data for identifying such motion vector is encoded for the temporal prediction.

Information relative to the motion vector and the residual block is encoded if the Inter prediction is selected. To further reduce the bitrate, assuming that motion is homogeneous, the motion vector is encoded by difference with respect to a motion vector predictor. Motion vector predictors of a set of motion information predictors is obtained from the motion vectors field 418 by a motion vector prediction and coding module 417.

The encoder 400 further comprises a selection module 406 for selection of the coding mode by applying an encoding cost criterion, such as a rate-distortion criterion. In order to further reduce redundancies a transform (such as DCT) is applied by transform module 407 to the residual block, the transformed data obtained is then quantized by quantization module 408 and entropy encoded by entropy encoding module 409. Finally, the encoded residual block of the current block being encoded is inserted into the bitstream 410.

The encoder 400 also performs decoding of the encoded image in order to produce a reference image for the motion estimation of the subsequent images. This enables the encoder and the decoder receiving the bitstream to have the same reference frames. The inverse quantization module 411 performs inverse quantization of the quantized data, followed by an inverse transform by reverse transform module 412. The reverse intra prediction module 413 uses the prediction information to determine which predictor to use for a given block and the reverse motion compensation module 414 actually adds the residual obtained by module 412 to the reference area obtained from the set of reference images 416.

Figure 5:
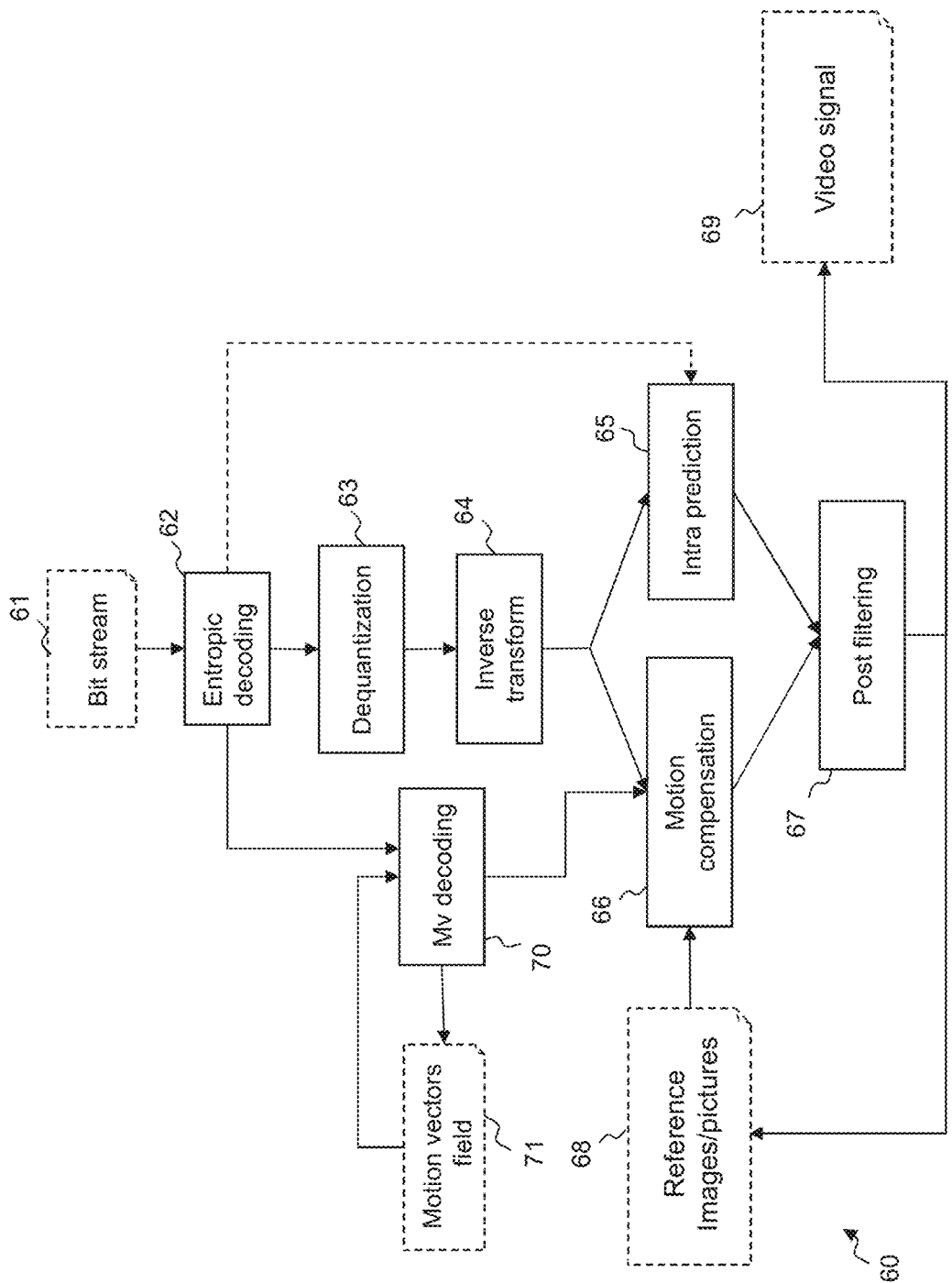
FIG. 5 is a flow chart illustrating steps of a decoding method according to embodiments of the invention.

Post filtering is then applied by module 415 to filter the reconstructed frame of pixels. In the embodiments of the invention an SAO loop filter is used in which compensation offsets are added to the pixel values of the reconstructed pixels of the reconstructed image FIG. 5 illustrates a block diagram of a decoder 60 which may be used to receive data from an encoder according an embodiment of the invention. The decoder is represented by connected modules, each module being adapted to implement, for example in the form of programming instructions to be executed by the CPU 311 of device 300, a corresponding step of a method implemented by the decoder 60.

The decoder 60 receives a bitstream 61 comprising encoding units, each one being composed of a header containing information on encoding parameters and a body containing the encoded video data. The structure of the bitstream in VVC is described in more detail below with reference to FIG. 6. As explained with respect to FIG. 4, the encoded video data is entropy encoded, and the motion vector predictors' indexes are encoded, for a given block, on a predetermined number of bits. The received encoded video data is entropy decoded by module 62. The residual data are then dequantized by module 63 and then a reverse transform is applied by module 64 to obtain pixel values.

The mode data indicating the coding mode are also entropy decoded and based on the mode, an INTRA type decoding or an INTER type decoding is performed on the encoded blocks of image data.

In the case of INTRA mode, an INTRA predictor is determined by intra reverse prediction module 65 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 70.

Motion vector decoding module 70 applies motion vector decoding for each current block encoded by motion prediction. Once an index of the motion vector predictor, for the current block has been obtained the actual value of the motion vector associated with the current block can be decoded and used to apply reverse motion compensation by module 66. The reference image portion indicated by the decoded motion vector is extracted from a reference image 68 to apply the reverse motion compensation 66. The motion vector field data 71 is updated with the decoded motion vector in order to be used for the inverse prediction of subsequent decoded motion vectors.

Finally, a decoded block is obtained. Post filtering is applied by post filtering module 67. A decoded video signal 69 is finally provided by the decoder 60.

Figure 6:
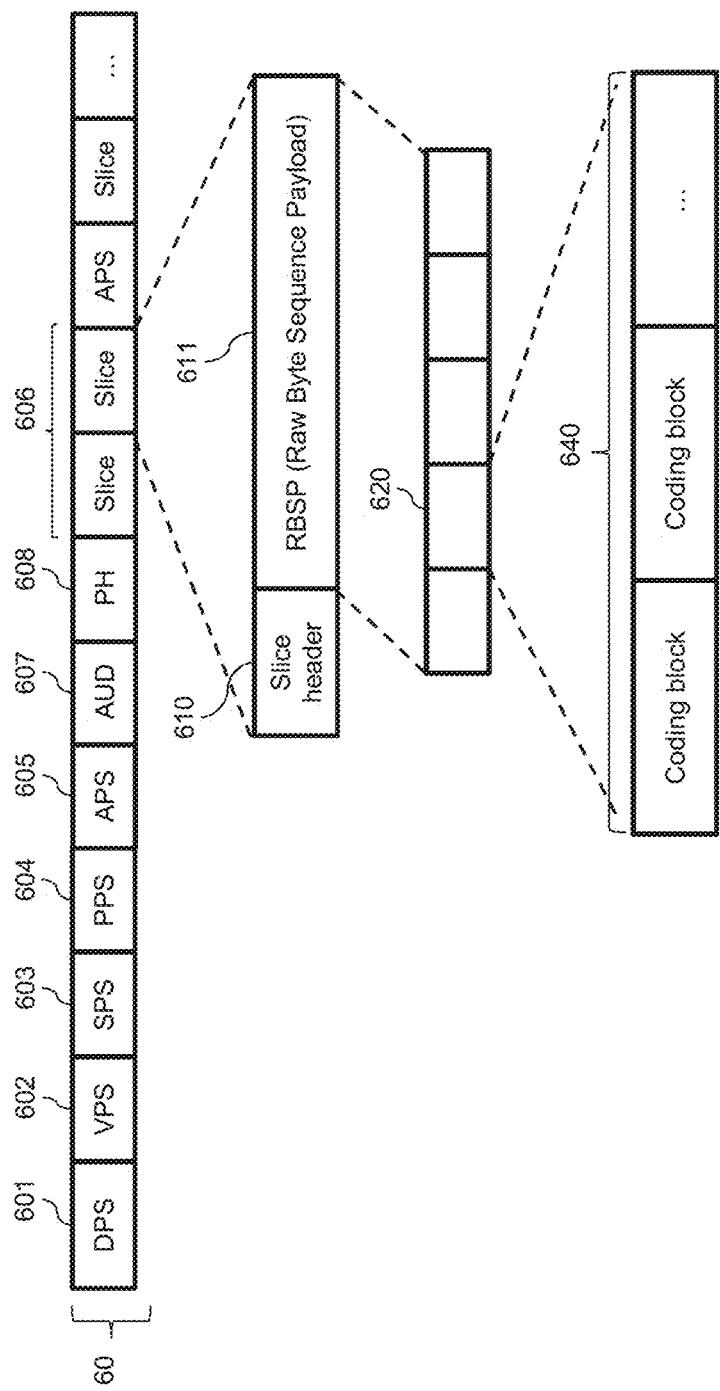
FIG. 6 illustrates the structure of the bitstream in the exemplary coding system VVC

FIG. 6 illustrates the organisation of the bitstream in the exemplary coding system VVC as described in JVET P2001-VE.

A bitstream 61 according to the VVC coding system is composed of an ordered sequence of syntax elements and coded data. The syntax elements and coded data are placed into Network Abstraction Layer (NAL) units 601-608. There are different NAL unit types. The network abstraction layer provides the ability to encapsulate the bitstream into different protocols, like RTP/IP, standing for Real Time Protocol/Internet Protocol, ISO Base Media File Format, etc. The network abstraction layer also provides a framework for packet loss resilience.

NAL units are divided into Video Coding Layer (VCL) NAL units and non-VCL NAL units. The VCL NAL units contain the actual encoded video data. The non-VCL NAL units contain additional information. This additional information may be parameters needed for the decoding of the encoded video data or supplemental data that may enhance usability of the decoded video data. NAL units 606 correspond to slices and constitute the VCL NAL units of the bitstream.

Different NAL units 601-605 correspond to different parameter sets, these NAL units are non-VCL NAL units. The Decoder Parameter Set (DPS) NAL unit 301 contains parameters that are constant for a given decoding process. The Video Parameter Set (VPS) NAL unit 602 contains parameters defined for the whole video, and thus the whole bitstream. The DPS NAL unit may define parameters more static than the parameters in the VPS. In other words, the parameters of DPS change less frequently than the parameter of the VPS.

The Sequence Parameter Set (SPS) NAL unit 603 contains parameters defined for a video sequence. In particular, the SPS NAL unit may define the sub pictures layout and associated parameters of the video sequences. The parameters associated to each subpicture specifies the coding constraints applied to the subpicture. In particular, it comprises a flag indicating that the temporal prediction between subpictures is restricted to the data coming from the same subpicture. Another flag may enable or disable the loop filters across the subpicture boundaries.

The Picture Parameter Set (PPS) NAL unit 604, PPS contains parameters defined for a picture or a group of pictures. The Adaptation Parameter Set (APS) NAL unit 605, contains parameters for loop filters typically the Adaptive Loop Filter (ALF) or the reshaper model (or luma mapping with chroma scaling (LMCS) model) or the scaling matrices that are used at the slice level.

The syntax of the PPS as proposed in the current version of VVC comprises syntax elements that specifies the size of the picture in luma samples and also the partitioning of each picture in tiles and slices.

The PPS contains syntax elements that make it possible to determine the slices location in a frame. Since a subpicture forms a rectangular region in the frame, it is possible to determine the set of slices, the parts of tiles or the tiles that belong to a subpicture from the Parameter Sets NAL units. The PPS as the APS have an ID mechanism to limit the amount of same PPS transmitted.

The main difference between the PPS and Picture Header is it transmission, the PPS is generally transmitted for a group of pictures compared to the PH which is systematically transmitted for each Picture. So the PPS compared to the PH contains parameters which can be constant for several pictures.

The bitstream may also contain Supplemental Enhancement Information (SEI) NAL units (not represented in FIG. 6). The periodicity of occurrence of these parameter sets in the bitstream is variable. A VPS that is defined for the whole bitstream may occur only once in the bitstream. To the contrary, an APS that is defined for a slice may occur once for each slice in each picture. Actually, different slices may rely on the same APS and thus there are generally fewer APS than slices in each picture. In particular, the APS are defined in the picture header. Yet, the ALF APS can be refined in the slice header.

The Access Unit Delimiter (AUD) NAL unit 607 separates two access units. An access unit is a set of NAL units which may comprise one or more coded pictures with the same decoding timestamp. This optional NAL unit contains only one syntax element in current VVC specification: p/c type, this syntax element. indicates that the slice type values for all slices of the coded pictures in the AU. If p/c type is set equal to 0, the AU contain only Intra slice. If equal to 1, it contains P and I slices. If equal to 2 it contains B, P or Intra slice as shown in Table 1 below.

TABLE 1

Interpretation of pic_type

| pic_type | slice_type values that may be present in the AU |
|---|---|
| 0 | I |
| 1 | P, I |
| 2 | B, P, I |

Picture Header

The PH NAL unit 608 is the Picture Header NAL unit which groups parameters common to a set of slices of one coded picture. The picture may refer to one or more APS to indicate the AFL parameters, reshaper model and the scaling matrices used by the slices of the Picture.

Each of the VCL NAL units 606 contains a slice. A slice may correspond to the whole picture or sub picture, a single tile or a plurality of tiles or a fraction of a tile. For example the slice of FIG. 6 contains several tiles 620. A slice is composed of a slice header 610 and a raw byte sequence payload, RBSP 611 that contains the coded pixels data encoded as coded blocks 640.

The picture header is transmitted at the beginning of each picture. The related syntax elements which can be decoded relate to:

the usage of this picture, reference frame or not
output frame
subpicture usage if needed
reference picture list if needed
colour plane if needed
partitioning update if overriding flag is enabled
delta QP parameter if needed
Motion information parameters if needed
ALF parameters if needed
SAO parameters if needed
quantification parameter if needed
LMCS parameter if needed
Scaling list parameters if needed
picture header extension if needed A complete description of all these parameters can be found in JVET_P2001-VE.

This structure for the picture header provides flexibility in providing all the tools which may be necessary in a particular picture. As such, this structure essentially defines the 'worst case' for decoding a picture which is often a key consideration for hardware decoders. However, there is significant redundancy in this structure which gives rise to an increase in bitrate.

The problem addressed by the present invention relates to sets of parameters in this picture header which relate to specific coding modes. For certain sets of parameters, sets of syntax elements are transmitted for both Inter and Intra slices. This increases the rate when all slices in a picture have the same type.

Table 2 shows these parameters in the current picture header decoding syntax using the definitions provided in JVET_P2001-VE. In this table, " . . . " represents syntax elements not relevant to this description.

TABLE 2

Partial Picture header

| | Descriptor |
|---|---|
| picture_header_rbsp( ) { | |
| .... | |
| if( partition_constraints_override_enabled_flag ) { | |
|   partition_constraints_override_flag | u(1) |
|   if( partition_constraints_override_flag ) { | |
|     pic_log2_diff_min_qt_min_cb_intra_slice_luma | ue(v) |
|     pic_log2_diff_min_qt_min_cb_inter_slice | ue(v) |
|     pic_max_mtt_hierarchy_depth_inter_slice | ue(v) |
|     pic_max_mtt_hierarchy_depth_intra_slice_luma | ue(v) |
|     if( pic_max_mtt_hierarchy_depth_intra_slice_luma != 0 ) { | |
|       pic_log2_diff_max_bt_min_qt_intra_slice_luma | ue(v) |
|       pic_log2_diff_max_tt_min_qt_intra_slice_luma | ue(v) |
|     } | |
|     if( pic_max_mtt_hierarchy_depth_inter_slice != 0 ) { | |
|       pic_log2_diff_max_bt_min_qt_inter_slice | ue(v) |
|       pic_log2_diff_max_tt_min_qt_inter_slice | ue(v) |
|     } | |
|     if( qtbtt_dual_tree_intra_flag ) { | |
|       pic_log2_diff_min_qt_min_cb_intra_slice_chroma | ue(v) |
|       pic_max_mtt_hierarchy_depth_intra_slice_chroma | ue(v) |
|       if( pic_max_mtt_hierarchy_depth_intra_slice_chroma != 0 ) { | |
|         pic_log2_diff_max_bt_min_qt_intra_slice_chroma | ue(v) |
|         pic_log2_diff_max_tt_min_qt_intra_slice_chroma | ue(v) |
|       } | |
|     } | |
|   } | |
| } | |
| if( cu_qp_delta_enabled_flag ) { | |
|   pic_cu_qp_delta_subdiv_intra_slice | ue(v) |

TABLE 2-continued

Partial Picture header

| | Descriptor |
|---|---|
|     pic_cu_qp_delta_subdiv_inter_slice<br>  }<br>if( pps_cu_chroma_qp_offset_list_enabled_flag ) { | ue(v) |
|     pic_cu_chroma_qp_offset_subdiv_intra_slice | ue(v) |
|     pic_cu_chroma_qp_offset_subdiv_inter_slice<br>  }<br>if( sps_temporal_mvp_enabled_flag ) | ue(v) |
|     pic_temporal_mvp_enabled_flag<br>if(!pps_mvd_l1_zero_idc ) | u(1) |
|     mvd_l1_zero_flag<br>if( !pps_six_minus_max_num_merge_cand_plus1 ) | u(1) |
|     pic_six_minus_max_num_merge_cand<br>if( sps_affine_enabled_flag ) | ue(v) |
|     pic_five_minus_max_num_subblock_merge_cand<br>if( sps_fpel_mmvd_enabled_flag ) | ue(v) |
|     pic_fpel_mmvd_enabled_flag<br>if( sps_bdof_pic_present_flag ) | u(1) |
|     pic_disable_bdof_flag<br>if( sps_dmvr_pic_present_flag ) | u(1) |
|     pic_disable_dmvr_flag<br>if( sps_prof_pic_present_flag ) | u(1) |
|     pic_disable_prof_flag<br>if( sps_triangle_enabled_flag && MaxNumMergeCand >= 2<br>&&<br>!pps_max_num_merge_cand_minus_max_num_triangle_cand_plus1 ) | u(1) |
|     pic_max_num_merge_cand_minus_max_num_triangle_cand<br>  ...<br>} | ue(v) |

Three particular sets of parameters in the above header may be redundant in certain cases. These three sets are considered in turn below.

The first set of parameters is related to the partitioning. The following are useful only for Inter slices:
    pic_log2_diff_min_qt_min_cb_inter_slice
    pic_max_mtt_hierarchy_depth_inter_slice
    pic_log2_diff_max_bt_min_qt_inter_slice
    pic_log2_diff_max_tt_min_qt_inter_slice And the following only for Intra slices:
    pic_log2_diff_min_qt_min_cb_infra_slice_luma
    pic_max_mtt_hierarchy_depth_intra_slice_luma
    pic_log2_diff_max_bt_min_qt_infra_slice_luma
    pic_log2_diff_max_tt_min_qt_infra_slice_luma
    pic_log2_diff_min_qt_min_cb_infra_slice_chroma
    pic_max_mtt_hierarchy_depth_intra_slice_chroma
    pic_log2_diff_max_bt_min_qt_infra_slice_chroma
    pic_log2_diff_max_tt_min_qt_infra_slice_chroma These parameters are equivalent as those described for Inter pictures respectively for Intra and Chroma.

As defined in Table 2, the chroma parameters are enabled only if the flag qtbtt_dual_tree_infra_flag (SPS level) is set equal to 1.

As depicted in Table 2, these partitioning parameters (Inter, Intra, and Chroma) are updated only if the partition_constraints_override_enabled_flag is enabled and if the partition_constraints_override_ flag is set equal to 1 in the Picture header.

The flag partition_constraints_override_enabled_flag is transmitted in the SPS.

The second set of parameters relates to the delta QP parameters. The two following parameters are needed only for Inter slices:
    pic_cu_qp_delta_subdiv_inter_slice
    pic_cu_chroma_qp_offset_subdiv_inter_slice and the two following ones for Intra slices:
    pic_cu_qp_delta_subdiv_infra_slice
    pic_cu_chroma_qp_offset_subdiv_infra_slice pic_cu_qp_delta_subdiv_inter_slice and pic_cu_qp_delta_subdiv_infra_slice are transmitted only if the cu_qp_delta_enabled_flag of the PPS is set equal to 1.

In the same way, pic_cu_chroma_qp_offset_subdiv_inter_slice and pic_cu_chroma_qp_offset_subdiv_infra_slice are decoded only if the pps_cu_chroma_qp_offset_list_enabled_flag is enabled in the PPS.

The third set of parameters relates to motion parameters and they are used only in Inter slices:
    pic_temporal_mvp_enabled_flag
    mvd_l1_zero_flag
    pic_six_minus_max_num_merge_cand
    pic_five_minus_max_num_subblock_merge_cand
    pic_fpel_mmvd_enabled_flag
    pic_disable_bdof_flag
    pic_disable_dmvr_flag
    pic_disable_prof_flag
    pic_max_num_merge_cand_minus_max_num_triangle_cand Each of these parameters can be decoded (or not) based on an 'enable flag' or an 'overriding flag' signaled at SPS or PPS header. However, each of these parameters are always transmitted, which contributes to increasing the bitrate.

This increase in rate is particularly noticeable when the coded picture only uses one type of slice (Inter or Intra) as several parameters are defined but never used.

A first way of ameliorating this problem is to signal a coding type in the picture header, and only decode the syntax elements relevant to this coding type. Most pictures are of a single coding type (e.g. INTER or INTRA) and as such this represents an effective manner to reduce the bitrate as unnecessary syntax elements.

Picture Type Indicated in Picture Header

In one example of the general concept, a picture type syntax element "picture_type_pic_header" is transmitted at the beginning of the picture header.

This picture type may be defined as follows:

When the picture type is set equal to I (or 0), all slices of a picture have the same slice type, Intra.

When the picture type is set equal to P (or 1), all slices of a picture have the same slice type, Inter P (Uni-prediction).

When the picture type is set equal to B (or 2), all slices of a picture have the same slice type, Inter B (Bi-prediction).

A decoder, receiving a picture header specifying picture_type_pic_header, thus initially determines a coding mode corresponding to a picture type and only decodes syntax elements related to this coding mode (or ignores syntax elements which are only relevant to a different coding mode).

In one example the picture type_pic_header is used to enable and disable some syntax elements not needed by way of imposing conditions on whether or not to decode certain parts of the picture header.

Table 3 below shows an example modification to the picture header indicating one way of implementing this conditional decoding; notable changes have been underlined. It should be noted that this table represents a partial header and has been reordered for reasons of clarity and conciseness. A larger header, potentially in a different order, may be more appropriate in practice.

TABLE 3

| Picture header with conditional decoding | Descriptor |
|---|---|
| picture_header_rbsp( ) { | |
|   non_reference_picture_flag | u(1) |
|   ... | |
|   picture type pic header | ue(v) |
|   ... | |
|   if( partition_constraints_override_enabled_flag ) { | |
|     partition_constraints_override_flag | u(1) |
|     if( partition_constraints_override_flag ) { | |
|       if(Condition1){ | |
|         pic_log2_diff_min_qt_min_cb_inter_slice | ue(v) |
|         pic_max_mtt_hierarchy_depth_inter_slice | ue(v) |
|         if( pic_max_mtt_hierarchy_depth_inter_slice != 0 ) { | |
|           pic_log2_diff_max_bt_min_qt_inter_slice | ue(v) |
|           pic_log2_diff_max_tt_min_qt_inter_slice | ue(v) |
|         } | |
|       } | |
|       if(Condition2){ | |
|         pic_log2_diff_min_qt_min_cb_intra_slice_luma | ue(v) |
|         pic_max_mtt_hierarchy_depth_intra_slice_luma | ue(v) |
|         if( pic_max_mtt_hierarchy_depth_intra_slice_luma != 0 ) { | |
|           pic_log2_diff_max_bt_min_qt_intra_slice_luma | ue(v) |
|           pic_log2_diff_max_tt_min_qt_intra_slice_luma | ue(v) |
|         } | |
|         if( qtbtt_dual_tree_intra_flag ) { | |
|           pic_log2_diff_min_qt_min_cb_intra_slice_chroma | ue(v) |
|           pic_max_mtt_hierarchy_depth_intra_slice_chroma | ue(v) |
|           if( pic_max_mtt_hierarchy_depth_intra_slice_chroma != 0 ) { | |
|             pic_log2_diff_max_bt_min_qt_intra_slice_chroma | ue(v) |
|             pic_log2_diff_max_tt_min_qt_intra_slice_chroma | ue(v) |
|           } | |
|         } | |
|       } | |
|     } | |
|   } | |
|   if( cu_qp_delta_enabled_flag ) { | |
|     if(Condition2){ | |
|       pic_cu_qp_delta_subdiv_intra_slice | ue(v) |
|     } | |
|     if(Condition1){ | |
|       pic_cu_qp_delta_subdiv_inter_slice | ue(v) |
|     } | |
|   } | |
|   if( pps_cu_chroma_qp_offset_list_enabled_flag ) { | |
|     if(Condition2){ | |
|       pic_cu_chroma_qp_offset_subdiv_intra_slice | ue(v) |
|     } | |
|     if(Condition1){ | |
|       pic_cu_chroma_qp_offset_subdiv_inter_slice | ue(v) |
|     } | |
|   } | |
|   if(Condition1){ | |
|   if( sps_temporal_mvp_enabled_flag ) | |
|     pic_temporal_mvp_enabled_flag | u(1) |
|   if(!pps_mvd_l1_zero_idc && Condition3) | |
|     mvd_l1_zero_flag | u(1) |
|   if( !pps_six_minus_max_num_merge_cand_plus1 ) | |

TABLE 3-continued

Picture header with conditional decoding

|  | Descriptor |
|---|---|
| pic_six_minus_max_num_merge_cand | ue(v) |
| if( sps_affine_enabled_flag ) | |
|   pic_five_minus_max_num_subblock_merge_cand | ue(v) |
| if( sps_fpel_mmvd_enabled_flag ) | |
|   pic_fpel_mmvd_enabled_flag | u(1) |
| if( sps_bdof_pic_present_flag && Conditions3 ) | |
|   pic_disable_bdof_flag | u(1) |
| if( sps_dmvr_pic_present_flag && Condition3) | |
|   pic_disable_dmvr_flag | u(1) |
| if( sps_prof_pic_present_flag) | |
|   pic_disable_prof_flag | u(1) |
| if( sps_triangle_enabled_flag && MaxNumMergeCand >= 2 && | |
|     !pps_max_num_merge_cand_minus_max_num_triangle_cand_plus1 && Condition3 ) | |
|   pic_max_num_merge_cand_minus_max_num_triangle_cand | ue(v) |
|   } | |
| if ( sps_ibc_enabled_flag ) | |
|   pic_six_minus_max_num_ibc_merge_cand | ue(v) |
| ... | |
|   rbsp_trailing_bits( ) | |
| } | |

The 'conditions' relate to the coding type and allow for conditional decoding of certain syntax elements, with elements which do not require decoding skipped. This improves decoding performance.

One example of the conditions are as follows:

Condition1: picture_type_pic_header==P OR picture_type_pic_header==B

Condition2: picture_type_pic_header==I

Condition3: picture_type_pic_header==B

When Condition1 is false, all slices are Intra, the following syntax elements are not decoded:

pic_max_mtt_hierarchy_depth_inter_slice
pic_log2_diff_max_bt_min_qt_inter_slice
pic_log2_diff_max_tt_min_qt_inter_slice
pic_cu_qp_delta_subdiv_inter_slice
pic_cu_chroma_qp_offset_subdiv_inter_slice
pic_temporal_mvp_enabled_flag
mvd_l1_zero_flag
pic_six_minus_max_num_merge_cand
pic_five_minus_max_num_subblock_merge_cand
pic_fpel_mmvd_enable_flag
pic_disable_bdof_flag
pic_disable_dmvr_flag
pic_disable_prof_flag
pic_max_num_merge_cand_minus_max_num_triangle_cand When Condition2 is false, all slices are Inter, the following syntax elements are not decoded:

pic_log2_diff_min_qt_min_cb_intra_slice_luma
pic_max_mtt_hierarchy_depth_intra_slice_luma
pic_log2_diff_max_bt_min_qt_intra_slice_luma
pic_log2_diff_max_tt_min_qt_intra_slice_luma
pic_log2_diff_min_qt_min_cb_intra_slice_chroma
pic_max_mtt_hierarchy_depth_intra_slice_chroma
pic_log2_diff_max_bt_min_qt_intra_slice_chroma
pic_log2_diff_max_tt_min_qt_intra_slice_chroma
pic_cu_qp_delta_subdiv_intra_slice
pic_cu_chroma_qp_offset_subdiv_intra_slice When Condition3 is false, all slices are NOT B picture, the following syntax elements are not decoded:

mvd_l1_zero_flag pic_disable_bdof_flag pic_disable_dmvr_flag pic_max_num_merge_cand_minus_max_num_triangle_cand As such, only the specific syntax elements for I, P or B pictures are decoded from the picture header, so it reduces the rate for each picture.

Enabling/Disabling Syntax Elements in Slice Header In one example, the picture_type_pic_header is used to enable or disable some syntax elements not needed. This is shown in the modified Picture Header in Table 4.

In this table, the slice_type is never transmitted. And its values have been replaced by the syntax element picture_type_pic_header. Based on this flag the num_ref_idx_active_override_flag can be transmitted if the picture contains only inter slices and never transmitted for Intra. In the same way the table num_ref_idx_active_minus1[i] is not decoded for picture containing Intra slices.

Both parameters num_ref_idx_active_override_flag and num_ref_idx_active_minus1[i] are related to the amount of reference frames. The num_ref_idx_active_override_flag signals if the parameters representing number of reference frames num_ref_idx_active_minus1[i] need to be decoded.

Similarly, cabac_init_flag, is not decoded when the picture contains Intra slices. This parameter relates to the initialisation CABAC context.

The collocated_from_l0_flag, collocated_ref_idx are not decoded when the picture contains Intra slices. these parameters relate to the selection of the collocated reference frame for the temporal motion predictor.

Eventually, pred_weight_table( ) is not decoded when the picture contains Intra slices. The advantage of this embodiment is that the rate related to the transmission of this slice type is saved compared to the current design.

TABLE 4

Modified Slice header with pic_type_pic_header

| | Descriptor |
|---|---|
| slice_header( ) { | |
|   slice_pic_order_cnt_lsb | u(v) |
| ... | |
|   slice_type | ue(v) |
| ... | |
|   if( pic_rpl_present_flag \|\| ( ( nal_unit_type != IDR_W_RADL && nal_unit_type != IDR_N_LP ) \|\| sps_idr_rpl_present_flag ) ) { | |
|     if( (picture_type_pic_header != I && num_ref_entries[ 0 ][ RplsIdx[ 0 ] ] > 1 ) \|\| (picture_type_pic_header == B && num_ref_entries[ 1 ][ RplsIdx[ 1 ] ] > 1 ) ) { | |
|       num_ref_idx_active_override_flag | u(1) |
|       if( num_ref_idx_active_override_flag ) | |
|         for( i = 0; i < (picture_type_pic_header == B ? 2: 1 ); i++ ) | |
|           if( num_ref_entries[ i ][ RplsIdx[ i ] ] > 1 ) | |
|             num_ref_idx_active_minus1[ i ] | ue(v) |
|     } | |
|   } | |
|   if(picture_type_pic_header != I ) { | |
|     if( cabac_init_present_flag ) | |
|       cabac_init_flag | u(1) |
|     if( pic_temporal_mvp_enabled_flag ) { | |
|       if(picture_type_pic_header == B && !pps_collocated_from_l0_idc ) | |
|         collocated_from_l0_flag | u(1) |
|       if( ( collocated_from_l0_flag && NumRefIdxActive[ 0 ] > 1 ) \|\| ( !collocated_from_l0_flag && NumRefIdxActive [ 1 ] > 1 ) ) | |
|         collocated_ref_idx | ue(v) |
|     } | |
|     if( ( pps_weighted_pred_flag && picture_type_pic_header == P ) \|\| ( pps_weighted_bipred_flag && picture_type_pic_header == B ) ) | |
|       pred_weight_table( ) | |
|   } | |
| ... | |
|   byte_alignment( ) | |
| } | |

In one particularly advantageous example, the above features can be combined. In this case picture_type_pic_header is used to enable and disable some syntax elements not needed in the picture header and the slice_type is not specified in the slice header and it is replaced by the picture_type_pic_head to decode or not some syntax elements in the slice header.

Slice Type Constraint in Picture Header

This feature represents a modification to the example above where instead of picture_type_pic_header, a syntax element "pic_slice_type_constraint" is transmitted at the beginning of the picture header. This syntax element indicates a constraint to the coding mode used in each of the slices within the picture. This differs from picture_type_pic_header as it does not necessarily mandate that all slices are the same, and allows for a broader range of values.

Example values and corresponding definitions for pic_slice_type_constraint are as follows:
    equals 0 indicates that all the slices of the picture are Intra
    equals 1 indicates that all the slices of the picture are Inter
    equals 2 indicates that the slice of the picture may have different types Two further definitions can be added:
    equals 3 indicates that all the slices of the picture are Inter B
    equals 4 indicates that all the slices of the picture are Inter P In one alternative example, the pic_slice_type_constraint definition is defining as the following:
    equals 0 indicates that all the slices of the picture are Inter B equals 1 indicates
    equals 1 indicates that all the slices of the picture are Inter P
    equals 2 indicates that all the slices of the picture are Intra
    equals 3 indicates that the slice of the picture may have different types
    equals 4 that all the slices of the picture are Inter In this example, the different picture type constraints are ordered according to the most probable to the least probable settings for a video sequence, in order to reduce the general number of bits needed to signal the pic_slice_type_constraint. Indeed, the pic_slice_type_constraint can be coded with a unary code or a unary max or a Golomb code. Consequently it is preferable to order the pic_slice_type_constraint value according to their probability.

Other characteristics of the pic_slice_type_constraint which could be incorporated into the above list include:
    The picture is an Instantaneous Decoder Refresh (IDR) picture
    The picture is a Clean Random Access (CRA) picture
    The picture is a Gradual Decoding Refresh (GDR) picture The picture is a non-intra random access point (non-IRAP), non-GDR picture and contains I-slices only The picture is a non-IRAP, non-GDR picture and may contain P- and I-slices only The picture is a non-IRAP, non-GDR picture and contains any of B-, P-, and/or I-slices Such values may be useful for streaming applications where IRAP and GDR pictures are more relevant. Indeed, these pictures offers an Intra random access point which can be used to change the first picture of the sequence for example or to synchronize a stream for live application, etc. . . . .

Indeed, streaming applications are more likely to require at least one Intra slice so as to 'refresh' the stream in the event of network package loss. In a simple implementation, this refers could be performed at a picture-wide level so as to avoid a picture having mixed coding types.

This example provides a similar same rate reduction as the earlier embodiments but allows for greater flexibility at the decoder by allowing for differently coded slices in the same picture directly via the picture header.

As for the example above regarding pic type pic header, the pic_slice_type_constraint is used to enable and disable some syntax elements not needed. This corresponds to setting conditions 1, 2 and 3 of Table 3 as the following:

Condition1: pic_slice_type_constraint!=0
Condition2: pic_slice_type_constraint==0 OR pic_slice_type_constraint==2
Condition3: pic_slice_type_constraint==3 OR pic_slice_type_constraint==2

An additional feature which provides additional improvements, the slice type of the slice header can be inferred and/or decoded with fewer bits than the current design.

As depicted in Table 5, the slice_type is decoded only when the pic_slice_type_constraint is set equal to 2. In that case, the slice_type may have one of the 3 values, I, P or B. When the pic_slice_type_constraint is set equal to 1 the slice_type is partially decoded. Indeed, thanks to the pic_slice_type_constraint, it is sure that the slice is Inter (P or B) so only one bit needs to be decoded to know if the slice_type is P or B.

When, the pic_slice_type_constraint is set equal to 0, it is sure that the slice_type is equal to I. When, the pic_slice_type_constraint is set equal to 0, it is sure that the slice_type is equal to B. Otherwise it is set equal to P.

Compared to the example shown in Table 3 above, the slice_type is not removed but its decoding is adapted.

The advantage of this feature is that the rate of the slice_type can be reduced when all slices of a frame are Intra or all are Inter.

TABLE 5

Modified Slice header with *pic_slice_type_constraint*

|  | Descriptor |
|---|---|
| slice_header( ) { | |
|     slice_pic_order_cnt_lsb | u(v) |
| ... | |
|   if(pic_slice_type_constraint==2){ | |
|     slice_type | ue(v) |
|   }else { | |
|     if(pic_slice_type_constraint==1) { | |
|       slice_type | u(1) |
|     } else { | |
|       if(pic_slice_type_constraint==0){ | |
|         slice_type = I | |

TABLE 5-continued

Modified Slice header with *pic_slice_type_constraint*

|  | Descriptor |
|---|---|
|     }else { | |
|       if(pic_slice_type_constraint==3){ | |
|         slice_type = B | |
|     }else { | |
|       slice_type = P | |
|     } | |
|     } | |
|   } | |
| } | |
| ... | |

In one further modification, the pic_slice_type_constraint is used to enable and disable some syntax elements not needed in the picture header and the slice_type of the slice header is fully or partially inferred, based on the pic_slice_type_constraint value.

The picture type "pic_type" of the AU delimiter NAL unit may be set according to the value of the pic_slice_type_constraint. Thus, when the pic_type is set equal to I, all pic_slice_type_constraint of this layer are set equal to 0. When pic_type is set equal to 2 (P, I), the all pic_slice_type_constraint of this layer can be equal to 0 or 3. Otherwise all pic_slice_type_constraint of this layer can take any value (e.g. one of the 5 values discussed above).

Modification to AU NAL

When using the features described above, it is not necessary for, the syntax element "pic_type" of the AU delimiter NAL unit to be decoded when the stream contains only one layer, or its decoding is optional in dependence on a flag transmitted in the VPS or SPS. Indeed, in that case it is redundant to transmit this syntax element as similar information is present in the picture header.

The feature contributes to rate reduction.

Optionally, the AU delimiter NAL unit is not decoded when the stream contains only one layer and is inferred based on the information in the picture header. Indeed, in that case information containing in the AU delimiter is not needed as it is redundant with the syntax element of the picture header. This feature further contributes to rate reduction.

AU NAL pic_type to Set the Set of Syntax Elements Decoded

In one simplified variant, the pic_type of the AU NAL unit is used to determine the set of syntax elements decoded in the picture header. In this variant, no picture type or picture type constraint is set in the picture header. But the conditions "Condition1, Condition2, Condition3", depicted in Table 3, are determined based on the pic_type of the AU NAL unit when it is signalled. Thus, decoding of the picture header is conditional on the slice coding mode for the slices in the picture (pic_type), and the slice coding mode is determined at a higher level than the picture header.

The 'conditions' relates, in this example, to the coding type of the pic_type and allow for conditional decoding of certain syntax elements as defined for the previous embodiment with elements which do not require decoding skipped. This improves decoding performance.

One example of the conditions are as follows:
Condition1: pic_type==1 OR pic_type==2
Condition2: pic_type==0
Condition3: pic_type==2

When, the pic_type of the AU NAL unit is not signalled the pic_type of the AU NAL unit is inferred to be equal to 2.

Merged Syntax Elements

Similar syntax elements used in both Inter and Intra modes may be merged so as to reduce the redundancy of the elements in the picture header and/or to reduce the number of conditions that require verification prior to decoding. In one example, the picture header only contains syntax elements which are agnostic to the coding mode to be used. That is—the same syntax element can be used in Inter or Intra. This is possible because most pictures only contain slices which require one type of coding mode (Inter or Intra) and as such two sets of syntax elements are not required.

Merging Intra and Inter syntax elements thus avoids the redundant coding of these syntax elements especially when all slices in a picture have the same type (I, P or B). When both Inter and Intra slices are present in the picture, the flexibility is less but the impact on Intra slice can be compensate by adapting the encoding choice Syntax elements which only differ by a 'coding type' label are particularly well-suited to merging.

When following the same design as discussed above, the following syntax elements may be merged as shown in Table 6 below:

TABLE 6

| Merged syntax elements | | |
|---|---|---|
| INTRA syntax | INTER syntax | Merged syntax |
| pic_log2_diff_min_qt_min_cb_intra_slice_luma | pic_log2_diff_min_qt_min_cb_inter_slice | pic_log2_diff_min_qt_min_cb_slice |
| pic_max_mtt_hierarchy_depth_intra_slice_luma | pic_max_mtt_hierarchy_depth_inter_slice | pic_max_mtt_hierarchy_depth_slice |
| pic_log2_diff_max_bt_min_qt_intra_slice_luma | pic_log2_diff_max_tt_min_qt_intra_slice_luma | pic_log2_diff_max_tt_min_qt_slice |
| pic_cu_qp_delta_subdiv_intra_slice | pic_cu_qp_delta_subdiv_inter_slice | pic_cu_qp_delta_subdiv_slice |
| pic_cu_chroma_qp_offset_subdiv_intra_slice | pic_cu_chroma_qp_offset_subdiv_inter_slice | pic_cu_chroma_qp_offset_subdiv_slice |

Table 7 gives an example of this simplification of this picture header syntax table.

TABLE 7

| Picture header with merged syntax elements | Descriptor |
|---|---|
| picture_header_rbsp( ) { | |
|   non_reference_picture_flag | u(1) |
| ... | |
|   if( partition_constraints_override_enabled_flag ) { | |
|     partition_constraints_override_flag | u(1) |
|     if( partition_constraints_override_flag ) { | |
|       pic_log2_diff_min_qt_min_cb_slice | ue(v) |
|       pic_max_mtt_hierarchy_depth_slice | ue(v) |
|       if( pic_max_mtt_hierarchy_depth_slice != 0 ) { | |
|         pic_log2_diff_max_bt_min_qt_slice | ue(v) |
|         pic_log2_diff_max_tt_min_qt_slice | ue(v) |
|       } | |
|       if( qtbtt_dual_tree_intra_flag ) { | |
| pic_log2_diff_min_qt_min_cb_intra_slice_chroma | ue(v) |
| pic_max_mtt_hierarchy_depth_intra_slice_chroma | ue(v) |
| if( pic_max_mtt_hierarchy_depth_intra_slice_chroma != 0 ) { | |
| pic_log2_diff_max_bt_min_qt_intra_slice_chroma | ue(v) |
| pic_log2_diff_max_tt_min_qt_intra_slice_chroma | ue(v) |
|         } | |
|       } | |
|     } | |
|   } | |
| if( cu_qp_delta_enabled_flag ) { | |
|   pic_cu_qp_delta_subdiv_slice | ue(v) |
| } | |
| if( pps_cu_chroma_qp_offset_list_enabled_flag ) { | |
|   pic_cu_chroma_qp_offset_subdiv_slice | ue(v) |
| } | |
| if( sps_temporal_mvp_enabled_flag ) | |
|   pic_temporal_mvp_enabled_flag | u(1) |
| if(!pps_mvd_l1_zero_idc ) | |
|   mvd_l1_zero_flag | u(1) |
| if( !pps_six_minus_max_num_merge_cand_plus1 ) | |
|   pic_six_minus_max_num_merge_cand | ue(v) |
| if( sps_affine_enabled_flag ) | |
|   pic_five_minus_max_num_subblock_merge_cand | ue(v) |
| if( sps_fpel_mmvd_enabled-flag ) | |
|   pic_fpel_mmvd_enabled_flag | u(1) |
| if( sps_bdof_pic_present_flag ) | |
|   pic_disable_bdof_flag | u(1) |
| if( sps_dmvr_pic_present_flag ) | |

TABLE 7-continued

Picture header with merged syntax elements

| | Descriptor |
|---|---|
|   pic_disable_dmvr_flag | u(1) |
| if( sps_prof_pic_present_flag ) | |
|   pic_disable_prof_flag | u(1) |
| if( sps_triangle_enabled_flag && MaxNumMergeCand >= 2 && !pps_max_num_merge_cand_minus_max_num_triangle_cand_plus1 ) | |
|   pic_max_num_merge_cand_minus_max_num_triangle_cand | ue(v) |
| if ( sps_ibc_enabled_flag ) | |
|   pic_six_minus_max_num_ibc_merge_cand | ue(v) |
| .... | |
|   rbsp_trailing_bits( ) | |
| } | |

Common Value for Syntax Elements

In one alternative, each pair of parameters still exists, and the common value is decoded in the picture header and the value for Intra slices is set equal to the common value when a slice is Intra (as defined at the slice header) and the value for Inter slices is set equal to the common value when a slice is Inter.

In one additional example, at least one flag is present at an upper level (PPS, SPS) which indicates if the Intra slices and/or the Inter slices use the common value or to retain a value given at an upper value (SPS, PPS). This allows for increased flexibility.

In one additional example, the Intra value can be updated at slice level in dependence on a variable in the slice header.

For example, the parameters in the slice header for Intra are:

slice_log2_diff_min_qt_min_cb_infra_slice_luma
  slice_max_mtt_hierarchy_depth_intra_slice_luma
  slice_log2_diff_max_bt_min_qt_infra_slice_luma
  slice_log2_cliff_max_tt_min_qt_infra_slice_luma
  slice_log2_diff_min_qt_min_cb_infra_slice_chroma
  slice_max_mtt_hierarchy_depth_intra_slice_chroma
  slice_log2_diff_max_bt_min_qt_infra_slice_chroma
  slice_log2_diff_max_tt_min_qt_infra_slice_chroma
  slice_cu_qp_delta_subdiv_intra_slice
  slice_cu_chroma_qp_offset_subdiv_intra_slice The advantage compared to the initial example is an increase of flexibility. Indeed, with this additional feature the same flexibility as the current design can be obtained. And more flexibility is obtained by adapting these parameters for each slice.

Overriding Flag at PPS/SPS

So as to provide additional flexibility, both Intra and Inter values can be sent in the slice header. These parameters can be signaled (or not) in the slice header in dependence on one or more overriding flags transmitted in the PPS and/or SPS or picture header to reduce the additional rate needed for these syntax elements inside the slice header.

For example, if the parameter pic_log2_diff_min_qt_min_cb_slice is transmitted in the picture header, an override flag log2_diff_min_qt_min_cb_slice_inter_override_flag is decoded to determine whether or not the slice_log2_diff_min_qt_min_cb_inter_slice_luma value is updated in Inter slices. when pic_log2_diff_min_qt_min_cb_slice is not decoded, this parameter will not be updated in the Inter slice and log2_diff_min_qt_min_cb_slice_inter_override_flag is set equal to 0.

In a similar manner, an override flag log2_diff_min_qt_min_cb_slice_intra_override_flag can be transmitted for Intra slices.

Optionally, when the parameters are transmitted in the slice header, their values are constrained by the values of their equivalent syntax elements on the picture header. More precisely, these values are limited to avoid an increase of complexity.

For example, the slice_log2_diff_min_qt_min_cb_intra_slice_luma in the slice header is limited to the value of pic_log2_diff_min_qt_min_cb_slice transmitted in the picture header. More precisely, the slice_log2_diff_min_qt_min_cb_intra_slice_luma can't be inferior to pic_log2_diff_min_qt_min_cb_slice. The effect of this limitation is that the slice can't use smaller block size than the size defined in the picture header.

The advantage of this example is that the decoder can set its complexity parameters for each picture. This complexity then does not need to increase for each new slice.

To further reduce the number of bits required, when a slice syntax element is constrained by its equivalent syntax elements in picture header value, its value may be predicted by the last value coded.

It should be appreciated that the 'merging' of syntax elements described above can be combined with other features to reduce the overall number of distinct syntax elements. By way of example, in such a combination the picture header would contain syntax elements agnostic to coding mode which are always decoded (i.e. 'merged syntax elements'), an indication of coding type (e.g. pic_type_pic_header or pic_slice_type_constraint), and then syntax elements which are conditionally decoded based on the coding type.

Duplication of Inter Parameters Only

In a further example, all parameters only related to Intra slices are removed from the picture header. Table 8 illustrates this example. Compared to the current design, the following syntax elements are not present in the picture header:

pic_log2_diff_min_qt_min_cb_intra_slice_luma
  pic_max_mtt_hierarchy_depth_intra_slice_luma
  pic_log2_diff_max_bt_min_qt_intra_slice_luma
  pic_log2_diff_max_tt_min_qt_intra_slice_luma
  pic_log2_diff_min_qt_min_cb_intra_slice_chroma
  pic_max_mtt_hierarchy_depth_intra_slice_chroma
  pic_log2_diff_max_bt_min_qt_intra_slice_chroma
  pic_log2_diff_max_tt_min_qt_intra_slice_chroma
  pic_cu_qp_delta_subdiv_intra_slice
  pic_cu_chroma_qp_offset_subdiv_infra_slice In this example, the value of these omitted syntax elements are set in the PPS and/or SPS. The advantage of this example is a reduction of the rate related to the picture header. Indeed, in a video sequence there are more Inter slices than Intra slices as the temporal correlation is significantly higher than the spatial correlation. Consequently, in the picture header, the least used syntax parameters are those which are solely related to Intra slices. The impact of this is largest for pictures containing only Inter slices because the rate of an Inter slice is significantly lower than the rate of an Intra slice for the same image area and quality.

Intra can be adapted. Moreover the impact on the rate is lower for an adaptation of Intra slices as less Intra slices are transmitted in the video.

In essence, the Picture Header is modified to remove Intra/Inter elements when it is determined that the picture only has slices coded in one of these modes. In such a way, the picture header only contains syntax elements relevant to the coding mode used for the entire picture. For the majority of pictures, this would be Inter coding (as Inter pictures are more common than Intra) so for simplicity this option may be implemented in all instances. If a picture has slices of a different coding mode, the syntax elements for that slice/picture as a whole can be decided from a different header (such as a slice header).

TABLE 8

Picture header with Intra syntax removed

| | Descriptor |
|---|---|
| picture_header_rbsp( ) { | |
|   non_reference_picture_flag | u(1) |
| ... | |
|   if( partition_constraints_override_enabled_flag ) { | |
|     partition_constraints_override_flag | u(1) |
|     if( partition_constraints_override_flag ) { | |
|       ~~pic_log2_diff_min_qt_min_cb_intra_slice_luma~~ | ue(v) |
|       pic_log2_diff_min_qt_min_cb_inter_slice | ue(v) |
|       pic_max_mtt_hierarchy_depth_inter_slice | ue(v) |
|       ~~pic_max_mtt_hierarchy_depth_intra_slice_~~ luma | ue(v) |
|       ~~if( pic_max_mtt_hierarchy_depth_intra_slice_luma !=~~ ~~0 ) {~~ | |
|       ~~pic_log2_diff_max_bt_min_qt_intra_slice_luma~~ | ue(v) |
|       ~~pic_log2_diff_max_tt_min_qt_intra_slice_luma~~ | ue(v) |
|       } | |
|       if( pic_max_mtt_hierarchy_depth_inter_slice != 0 ) { | |
|         pic_log2_diff_max_bt_min_qt_inter_slice | ue(v) |
|         pic_log2_diff_max_tt_min_qt_inter_slice | ue(v) |
|       } | |
|       if( qtbtt_dual_tree_intra_flag ) { | |
|       ~~pic_log2_diff_min_qt_min_cb_intra_slice_chroma~~ | ue(v) |
|       ~~pic_max_mtt_hierarchy_depth_intra_slice_chroma~~ | ue(v) |
|       ~~if( pic_max_mtt_hierarchy_depth_intra_slice_chroma != 0 ) {~~ | |
|       ~~pic_log2_diff_max_bt_min_qt_intra_slice_chroma~~ | ue(v) |
|       ~~pic_log2_diff_max_tt_min_qt_intra_slice_chroma~~ | ue(v) |
|       } | |
|     } | |
|   } | |
|   } | |
|   if( cu_qp_delta_enabled_flag ) { | |
|     ~~pic_cu_qp_delta_subdiv_intra_slice~~ | ue(v) |
|     pic_cu_qp_delta_subdiv_inter_slice | ue(v) |
|   } | |
|   if( pps_cu_chroma_qp_offset_list_enabled_flag ) { | |
|     ~~pic_cu_chroma_qp_offset_subdiv_intra_slice~~ | ue(v) |
|     pic_cu_chroma_qp_offset_subdiv_inter_slice | ue(v) |
|   } | |
| ... | |
|   rbsp_trailing_bits( ) | |
| } | |

Alternatively, the Intra parameters mentioned above are transmitted in the Picture Header when the sequence contains only Intra pictures (as signaled in the Sequence Header or SPS). The advantage of this embodiment is that the Intra parameters can be adapted for full Intra sequences where the impact of this adaptation should be more important.

Similarly, when the sequence contains only Intra pictures, the set of Inter syntax elements is not transmitted. The advantage is that there is no additional rate related to Inter parameters which were not used.

In one additional embodiment, the set of Intra syntax elements is transmitted in the slice header when the slice type is Intra. The advantage of this embodiment is a larger flexibility compared to the main embodiment because the For example, the parameters in the slice header for Intra are:

slice_log2_diff_min_qt_min_cb_intra_slice_luma
slice_max_mtt_hierarchy_depth_infra_slice_luma
slice_log2_diff_max_bt_min_qt_infra_slice_luma
slice_log2_diff_max_tt_min_qt_infra_slice_luma
slice_log2_diff_min_qt_min_cb_infra_slice_chroma
slice_max_mtt_hierarchy_depth_infra_slice_chroma
slice_log2_diff_max_bt_min_qt_infra_slice_chroma
slice_log2_diff_max_tt_min_qt_infra_slice_chroma
slice_cu_qp_delta_subdiv_infra_slice
slice_cu_chroma_qp_offset_subdiv_infra_slice To reduce complexity, when the parameters are transmitted in the Intra slice, their values may be constrained by the values of their equivalent Inter syntax elements. More precisely, these values are limited to avoid an increase of complexity.

For example, the slice_log2_diff_min_qt_min_cb_infra_slice_luma in the slice header is limited to the value of pic_log2_diff_min_qt_min_cb_inter_slice transmitted in the picture header. More precisely, the minimum QT size (which gives the minimum block size) value in the current slice can't be inferior to the minimum QT size value defined in the PH. So, the slice_log2_diff_min_qt_min_cb_intra_slice_luma can't be inferior to pic_log2_diff_min_qt_min_cb_inter_slice.

The advantage of this feature is that the decoder can set its complexity parameters for each picture; it then does not need to increase this complexity for each new slice as the 'worst-case' complexity is set in the picture header.

This constraint can also be applied if the Inter parameters can be transmitted in the slice header.

To further reduce the number of bits coded, when a slice syntax element is constrained by its equivalent syntax element Inter value in the picture header, its value may be predicted by its equivalent syntax element Inter value. For example, a value can be decoded and slice_log2_diff_min_qt_min_cb_infra_slice_luma is equal to this value+pic_log2_diff_min_qt_min_cb_inter_slice To provide additional flexibility, the set of Intra syntax elements is transmitted in the slice header when the slice type is Intra and if an overriding flag signaled their usage or not. The overriding flag is signaled at SPS or PPS level. And an additional overriding flag can be transmitted in the slice header as the current overriding flag in the picture header for these parameters.

Overriding Flags for Intra/Inter

The picture header syntax elements defined only for Intra or Inter slice may be decoded (or not) in dependence on one or more overriding flags specific for Intra and Inter. This allows for greater flexibility while avoiding decoding unnecessary syntax elements. Table 9 illustrates this feature.

In this table, the syntax elements related to partitioning are grouped separately for Intra and Inter. The partition_constraints_override_enabled_flag is replaced by two syntax elements, partition_constraints_override_enabled_flag_inter and partition_constraints_override_enabled_flag_intra decoded in the SPS.

Based on the partition_constraints_override_enabled_flag_intra the new flag syntax element_partition_constraints_override_flag_infra is decoded and if it is set equal to 1, the following partitioning syntax elements for intra are decoded or can be decoded according to the other constraints:

pic_log2_diff_min_qt_min_cb_infra_slice_luma
pic_max_mtt_hierarchy_depth_intra_slice_luma
pic_log2_diff_max_bt_min_qt_infra_slice_luma
pic_log2_diff_max_tt_min_qt_infra_slice_luma
pic_log2_diff_min_qt_min_cb_infra_slice_chroma
pic_max_mtt_hierarchy_depth_intra_slice_chroma
pic_log2_diff_max_bt_min_qt_intra_slice_chroma
pic_log2_diff_max_tt_min_qt_intra_slice_chroma When the overriding flag(s) are set equal to 0 the default value set in the SPS are used to set these values.

In the same way, the partition_constraints_override_flag_inter is decoded if the related overriding flag is set equal to 1 in the SPS. If this picture header syntax element is true, the partitioning syntax elements for Inter are used.

pic_log2_diff_min_qt_min_cb_inter_slice
pic_max_mtt_hierarchy_depth_inter_slice
pic_log2_diff_max_bt_min_qt_inter_slice
pic_log2_diff_max_tt_min_qt_inter_slice When the overriding flag are set equal to 0 the default value set in the SPS are used to set these values.

In the same way, for syntax elements related delta QP, the cu_qp_delta_enabled_flag is split into 2 flags one for Intra and one for Inter: cu_qp_delta_enabled_flag_infra, cu_qp_delta_enabled_flag_inter. These flags are transmitted in the PPS or SPS and they are transmitted only if if no_qp_delta_constraint_flag is equal to 0.

The pps_cu_chroma_qp_offset_list_enabled_flag is split into 2 flags one for Intra and one for Inter: pps_cu_chroma_qp_offset_list_enabled_flag_intra, pps_cu_chroma_qp_offset_list_enabled_flag_inter. These flags are transmitted in the PPS and replace pps_cu_chroma_qp_offset_list_enabled_flag.

For the picture header syntax elements related to the motion parameters a motion_parameters_override_enabled_flag is transmitted in the SPS. If it is enabled, a motion_parameters_override_flag flag is decoded. If it is equal to true, all the syntax elements related to these parameters can be decoded. When it is equal to false, these parameters take the values of their corresponding PPS or SPS value. For the flags the value can be only the SPS or PPS value as for example:

*pic_temporal_mvp_enabled_flag* =sps_temporal_mvp_enabled_flag

*mvd_l1_zero_flag* =!pps_mvd_l1_zero_idc

*pic_fpel_mmvd_enabled_flag* =sps_fpel_mmvd_enabled_flag

*pic_disable_bdof_flag* =sps_bdof_pic_present_flag

*pic_disable_dmvr_flag* =sps_dmvr_pic_present_flag

*pic_disable_prof_flag* =sps_prof_pic_present_flag

In one example, at least a default value can be transmitted at SPS or PPS header to defined one of these default values.

For non flag value: the maximum value set in the SPS or PPS can be used for example: pic_six_minus_max_num_merge_cand and pic_max_num_merge_cand_minus_max_num_triangle_cand can depends respectively to pps_six_minus_max_num_merge_cand_plus1 and pps_max_num_merge_cand_minus_max_num_triangle_cand_plu.

For pic_five_minus_max_num_subblock_merge_cand no definition at SPS level but the default value can be set by 5−(sps_sbtmvp_enabled_flag && pic_temporal_mvp_enabled_flag)

In embodiment an SPS and/or PPS value is transmitted to fix this default value.

In one addition embodiment specific parameters can be transmitted in the SPS or PPS header to set this value The advantages of using overriding flags are the same as discussed above, but it offers more flexibility (at the cost of transmitting and decoding a flag) as Intra parameters can be transmitted if the specified overriding flags have been set equal to true.

TABLE 9

| Picture header with override flags | |
|---|---|
| | Descriptor |
| picture_header_rbsp( ) { | |
|     non_reference_picture_flag | u(1) |
| ... | |
|     if( partition_constraints_override_enabled_flag_intra ) { | |
|         partition_constraints_override_flag_intra | u(1) |
|         if( partition_constraints_override_flag_intra ) { | |
|             pic_log2_diff_min_qt_min_cb_intra_slice_luma | ue(v) |
|             pic_max_mtt_hierarchy_depth_intra_slice_luma | ue(v) |
|             if( pic_max_mtt_hierarchy_depth_intra_slice_luma != 0 ){ | |
|                 pic_log2_diff_max_bt_min_qt_intra_slice_luma | ue(v) |
|                 pic_log2_diff_max_tt_min_qt_intra_slice_luma | ue(v) |
|             } | |
|             if( qtbtt_dual_tree_intra_flag ) { | |
|                 pic_log2_diff_min_qt_min_cb_intra_slice_chroma | ue(v) |
|                 pic_max_mtt_hierarchy_depth_intra_slice_chroma | ue(v) |
|               if( pic_max_mtt_hierarchy_depth_intra_slice_chroma != 0 ) { | |
|                 pic_log2_diff_max_bt_min_qt_intra_slice_chroma | ue(v) |
|                 pic_log2_diff_max_tt_min_qt_intra_slice_chroma | ue(v) |
|               } | |
|             } | |
|         } | |
|     } | |
|     if( partition_constraints_override_enabled_flag_inter ) { | |
|         partition_constraints_override_flag_inter | u(1) |
|         if( partition_constraints_override_flag_inter ) { | |
|             pic_log2_diff_min_qt_min_cb_inter_slice | ue(v) |
|             pic_max_mtt_hierarchy_depth_inter_slice | ue(v) |
|             if( pic_max_mtt_hierarchy_depth_inter_slice != 0 ) { | |
|                 pic_log2_diff_max_bt_min_qt_inter_slice | ue(v) |
|                 pic_log2_diff_max_tt_min_qt_inter_slice | ue(v) |
|             } | |
|         } | |
|     } | |
|     if( cu_qp_delta_enabled_flag_intra ) { | |
|         pic_cu_qp_delta_subdiv_intra_slice | ue(v) |
|     } | |
| if( cu_qp_delta_enabled_flag_inter ) { | |
|     pic_cu_qp_delta_subdiv_inter_slice | ue(v) |
|     } | |
|     if( pps_cu_chroma_qp_offset_list_enabled_flag_intra ) { | |
|         pic_cu_chroma_qp_offset_subdiv_intra_slice | ue(v) |
|     } | |
|     if( pps_cu_chroma_qp_offset_list_enabled_flag_inter ) { | |
|         pic_cu_chroma_qp_offset_subdiv_inter_slice | ue(v) |
|     } | |
|     if( motion_parameters_override_enabled_flag ) { | |
|         motion_parameters_override_flag | u(1) |
|     if( motion_parameters_override_flag ) { | |
|     if( sps_temporal_mvp_enabled_flag ) | |
|         pic_temporal_mvp_enabled_flag | u(1) |
|     if(!pps_mvd_l1_zero_idc ) | |
|         mvd_l1_zero_flag | u(1) |
|     if( !pps_six_minus_max_num_merge_cand_plus1 ) | |
|         pic_six_minus_max_num_merge_cand | ue(v) |
|     if( sps_affine_enabled_flag ) | |
|         pic_five_minus_max_num_subblock_merge_cand | ue(v) |
|     if( sps_fpel_mmvd_enabled_flag ) | |
|         pic_fpel_mmvd_enabled_flag | u(1) |
|     if( sps_bdof_pic_present_flag ) | |
|         pic_disable_bdof_flag | u(1) |
|     if( sps_dmvr_pic_present_flag ) | |
|         pic_disable_dmvr_flag | u(1) |
|     if( sps_prof_pic_present_flag ) | |
|         pic_disable_prof_flag | u(1) |
|     if( sps_triangle_enabled_flag && MaxNumMergeCand >= 2 && | |
|     !pps_max_num_merge_cand_minus_max_num_triangle_cand_plus1 ) | |
|   pic_max_num_merge_cand_minus_max_num_triangle_cand | ue(v) |
|     } | |
| } | |
|     if ( sps_ibc_enabled_flag ) | |
|         pic_six_minus_max_num_ibc_merge_cand | ue(v) |
| ... | |
|     rbsp_trailing_bits( ) | |
| } | |

It should be noted that the position of these new override flags can be modified, for example, the Inter flag may be moved above the Intra flag. This may be beneficial as more pictures use Inter coding so this flag may be more relevant.

Similarly, the previous flag partition_constraints_override_flag may be retained and checked to see whether the inter or intra flags should also be checked.

In one embodiment, two overriding flags are sent before these different syntax elements. One specifies that Inter elements are override or not and one specifies that Intra elements are overridden. These override flags may have been defined in the same way in an upper level. Compared to the previous example, fewer additional override flags are needed.

Override Flags and Merged Syntax Elements

A particularly interesting combination is that of using override flags (e.g. Table 9) and merged syntax elements (e.g. Table 6). Additionally, some of the parameters can be removed from the Picture header as discussed above (e.g. Table 8).

For example, the syntax elements which can be merged are merged. The cu delta QP parameters are particularly interesting in that case as well as the partitioning flag related to Intra and Inter luma. Otherwise, the Chroma partitioning parameters can be removed as described above, and the motion parameters can be set (or not) in dependence on one or more overriding flags. Table 10 shows an example of such a combination:

TABLE 10

Picture header with a combination of features

| | Descriptor |
|---|---|
| picture_header_rbsp( ) { | |
|   non_reference_picture_flag | u(1) |
| ... | |
|   if( partition_constraints_override_enabled_flag ) { | |
|     partition_constraints_override_flag | u(1) |
|     if( partition_constraints_override_flag ) { | |
|       pic log2 diff min qt min cb slice | ue(v) |
|       pic_max_mtt_hierarchy_depth_slice | ue(v) |
|       if( pic_max_mtt_hierarchy_depth_slice != 0 ) { | |
|         pic_log2_diff_max_bt_min_qt_slice | ue(v) |
|         pic log2 diff max tt min qt slice | ue(v) |
|       } | |
| s | |
| | ~~ue(v)~~ |
|       ~~pic_log2_diff_min_qt_min_cb_intra_slice_chroma~~ | |
| | ~~ue(v)~~ |
|       ~~pic_max_mtt_hierarchy_depth_intra_slice_chroma~~ | |
|       ~~if( pic_max_mtt_hierarchy_depth_intra_slice_chroma != 0 ) {~~ | |
| | ~~ue(v)~~ |
|       ~~pic_log2_diff_max_bt_min_qt_intra_slice_chroma~~ | |
| | ~~ue(v)~~ |
|       ~~pic_log2_diff_max_tt_min_qt_intra_slice_chroma~~ | |
|     } | |
|   } | |
| } | |
| if( cu_qp_delta_enabled_flag ) { | |
|   pic cu qp delta subdiv slice | ue(v) |
| } | |
| if( pps_cu_chroma_qp_offset_list_enabled_flag ) { | |
|   pic cu chroma qp offset subdiv slice | ue(v) |
| } | |
| if( motion_parameters_override_enabled_flag ) { | |
|   motion_parameters_override_flag | u(1) |
|   if( motion_parameters_override_flag ) { | |
|     if( sps_temporal_mvp_enabled_flag ) | |
|       pic_temporal_mvp_enabled_flag | u(1) |
|     if(!pps_mvd_l1_zero_idc ) | |

TABLE 10-continued

Picture header with a combination of features

| | Descriptor |
|---|---|
|       mvd_l1_zero_flag | u(1) |
|     if( !pps_six_minus_max_num_merge_cand_plus1 ) | |
|       pic_six_minus_max_num_merge_cand | ue(v) |
|     if( sps_affine_enabled_flag ) | |
|       pic_five_minus_max_num_subblock_merge_cand | ue(v) |
|     if( sps_fpel_mmvd_enabled_flag ) | |
|       pic_fpel_mmvd_enabled_flag | u(1) |
|     if( sps_bdof_pic_present_flag ) | |
|       pic_disable_bdof_flag | u(1) |
|     if( sps_dmvr_pic_present_flag ) | |
|       pic_disabled_dmvr_flag | u(1) |
|     if( sps_prof_pic_present_flag ) | |
|       pic_disable_prof_flag | u(1) |
|     if( sps_triangle_enabled_flag && MaxNumMergeCand >= 2 && | |
|       !pps_max_num_merge_cand_minus_max_num_triangle_cand_plus1 ) | |
|       pic_max_num_merge_cand_minus_max_num_triangle_cand | ue(v) |
|     } | |
|   } | |
| if ( sps_ibc_enabled_flag ) | |
|     pic_six_minus_max_num_ibc_merge_cand | ue(v) |
| ... | |
| rbsp_trailing_bits( ) | |
| } | |

It should be appreciated that the above features may be provided in combination with one-another. As with the specific combination discussed above, doing so may provide specific advantages suited to a specific implementation; for example increased flexibility, or specifying a 'worst-case' example. In other examples, complexity requirements may have a higher priority than rate reduction (for example) and as such a feature may be implemented individually.

Implementation of the Invention

Figure 7:
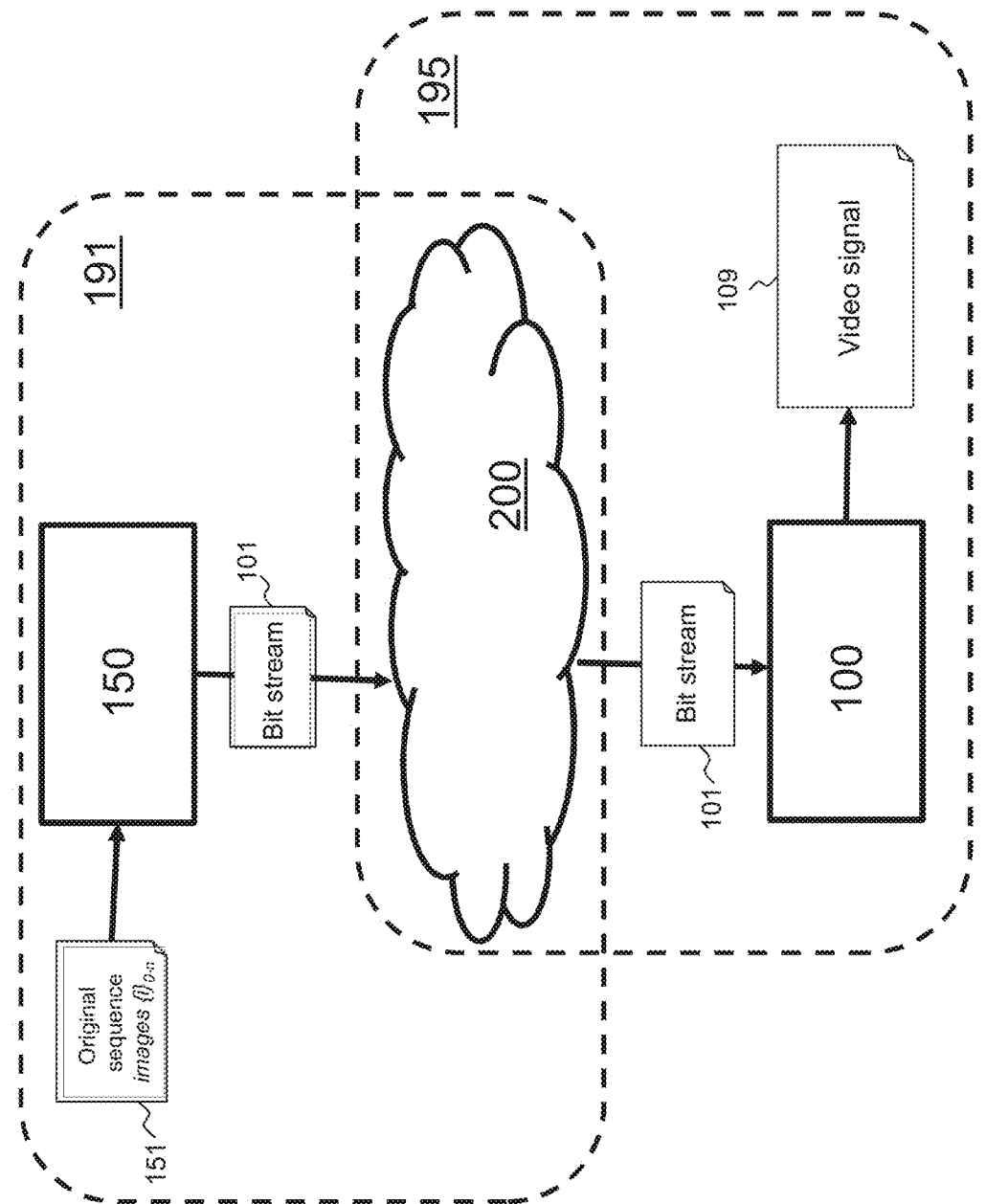
FIG. 7 is a diagram showing a system comprising an encoder or a decoder and a communication network according to embodiments of the present invention.

FIG. 7 shows a system 191 195 comprising at least one of an encoder 150 or a decoder 100 and a communication network 199 according to embodiments of the present invention. According to an embodiment, the system 195 is for processing and providing a content (for example, a video and audio content for displaying/outputting or streaming video/audio content) to a user, who has access to the decoder 100, for example through a user interface of a user terminal comprising the decoder 100 or a user terminal that is communicable with the decoder 100. Such a user terminal may be a computer, a mobile phone, a tablet or any other type of a device capable of providing/displaying the (provided/streamed) content to the user. The system 195 obtains/receives a bitstream 101 (in the form of a continuous stream or a signal—e.g. while earlier video/audio are being displayed/output) via the communication network 199. According to an embodiment, the system 191 is for processing a content and storing the processed content, for example a video and audio content processed for displaying/outputting/streaming at a later time. The system 191 obtains/receives a content comprising an original sequence of images 151, which is received and processed (including filtering with a deblocking filter according to the present invention) by the encoder 150, and the encoder 150 generates a bitstream 101 that is to be communicated to the decoder 100 via a communication network 191. The bitstream 101 is then communicated to the decoder 100 in a number of ways, for example it may be generated in advance by the encoder 150 and stored as data in a storage apparatus in the communication network 199 (e.g. on a server or a cloud storage) until a user requests the content (i.e. the bitstream data) from the storage apparatus, at which point the data is communicated/streamed to the decoder 100 from the storage apparatus. The system 191 may also comprise a content providing apparatus for providing/streaming, to the user (e.g. by communicating data for a user interface to be displayed on a user terminal), content information for the content stored in the storage apparatus (e.g. the title of the content and other meta/storage location data for identifying, selecting and requesting the content), and for receiving and processing a user request for a content so that the requested content can be delivered/streamed from the storage apparatus to the user terminal. Alternatively, the encoder 150 generates the bitstream 101 and communicates/streams it directly to the decoder 100 as and when the user requests the content. The decoder 100 then receives the bitstream 101 (or a signal) and performs filtering with a deblocking filter according to the invention to obtain/generate a video signal 109 and/or audio signal, which is then used by a user terminal to provide the requested content to the user.

Any step of the method/process according to the invention or functions described herein may be implemented in hardware, software, firmware, or any combination thereof. If implemented in software, the steps/functions may be stored on or transmitted over, as one or more instructions or code or program, or a computer-readable medium, and executed by one or more hardware-based processing unit such as a programmable computing machine, which may be a PC ("Personal Computer"), a DSP ("Digital Signal Processor"), a circuit, a circuitry, a processor and a memory, a general purpose microprocessor or a central processing unit, a microcontroller, an ASIC ("Application-Specific Integrated Circuit"), a field programmable logic arrays (FPGAs), or other equivalent integrated or discrete logic circuitry. Accordingly, the term "processor" as used herein may refer to any of the foregoing structure or any other structure suitable for implementation of the techniques describe herein.

Embodiments of the present invention can also be realized by wide variety of devices or apparatuses, including a wireless handset, an integrated circuit (IC) or a set of JCs (e.g. a chip set). Various components, modules, or units are described herein to illustrate functional aspects of devices/apparatuses configured to perform those embodiments, but do not necessarily require realization by different hardware units. Rather, various modules/units may be combined in a codec hardware unit or provided by a collection of interoperative hardware units, including one or more processors in conjunction with suitable software/firmware.

Embodiments of the present invention can be realized by a computer of a system or apparatus that reads out and executes computer executable instructions (e.g., one or more programs) recorded on a storage medium to perform the modules/units/functions of one or more of the above-described embodiments and/or that includes one or more processing unit or circuits for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more processing unit or circuits to perform the functions of one or more of the above-described embodiments. The computer may include a network of separate computers or separate processing units to read out and execute the computer executable instructions. The computer executable instructions may be provided to the computer, for example, from a computer-readable medium such as a communication medium via a network or a tangible storage medium. The communication medium may be a signal/bitstream/carrier wave. The tangible storage medium is a "non-transitory computer-readable storage medium" which may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. At least some of the steps/functions may also be implemented in hardware by a machine or a dedicated component, such as an FPGA ("Field-Programmable Gate Array") or an ASIC ("Application-Specific Integrated Circuit").

Figure 8:
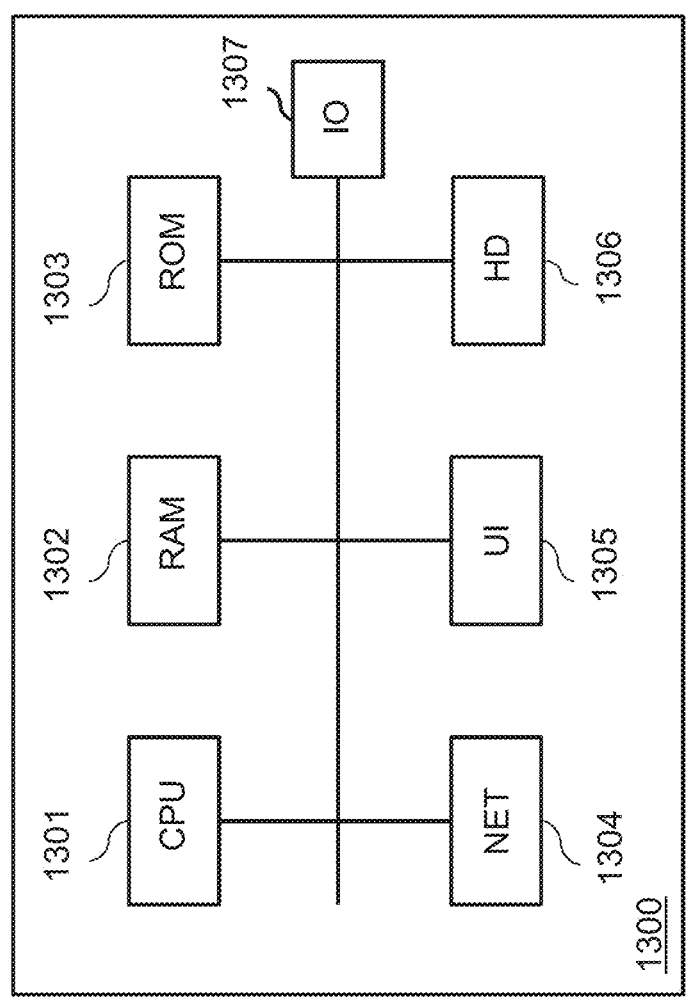
FIG. 8 is a schematic block diagram of a computing device for implementation of one or more embodiments of the invention.

FIG. 8 is a schematic block diagram of a computing device 1300 for implementation of one or more embodiments of the invention. The computing device 1300 may be a device such as a micro-computer, a workstation or a light portable device. The computing device 1300 comprises a communication bus connected to: —a central processing unit (CPU) 1301, such as a microprocessor; —a random access memory (RAM) 1302 for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example; —a read only memory (ROM) 1303 for storing computer programs for implementing embodiments of the invention; —a network interface (NET) 1304 is typically connected to a communication network over which digital data to be processed are transmitted or received. The network interface (NET) 1304 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1301; —a user interface (UI) 1305 may be used for receiving inputs from a user or to display information to a user; —a hard disk (HD) 1306 may be provided as a mass storage device; —an Input/Output module (TO) 1307 may be used for receiving/sending data from/to external devices such as a video source or display. The executable code may be stored either in the ROM 1303, on the HD 1306 or on a removable digital medium such as, for example a disk. According to a variant, the executable code of the programs can be received by means of a communication network, via the NET 1304, in order to be stored in one of the storage means of the communication device 1300, such as the HD 1306, before being executed. The CPU 1301 is adapted to control and direct the execution of the instructions or portions of software code of the program or programs according to embodiments of the invention, which instructions are stored in one of the aforementioned storage means. After powering on, the CPU 1301 is capable of executing instructions from main RAM memory 1302 relating to a software application after those instructions have been loaded from the program ROM 1303 or the HD 1306, for example. Such a software application, when executed by the CPU 1301, causes the steps of the method according to the invention to be performed.

It is also understood that according to another embodiment of the present invention, a decoder according to an aforementioned embodiment is provided in a user terminal such as a computer, a mobile phone (a cellular phone), a table or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such examples are provided below with reference to FIGS. 9 and 10.

Network Camera

Figure 9:
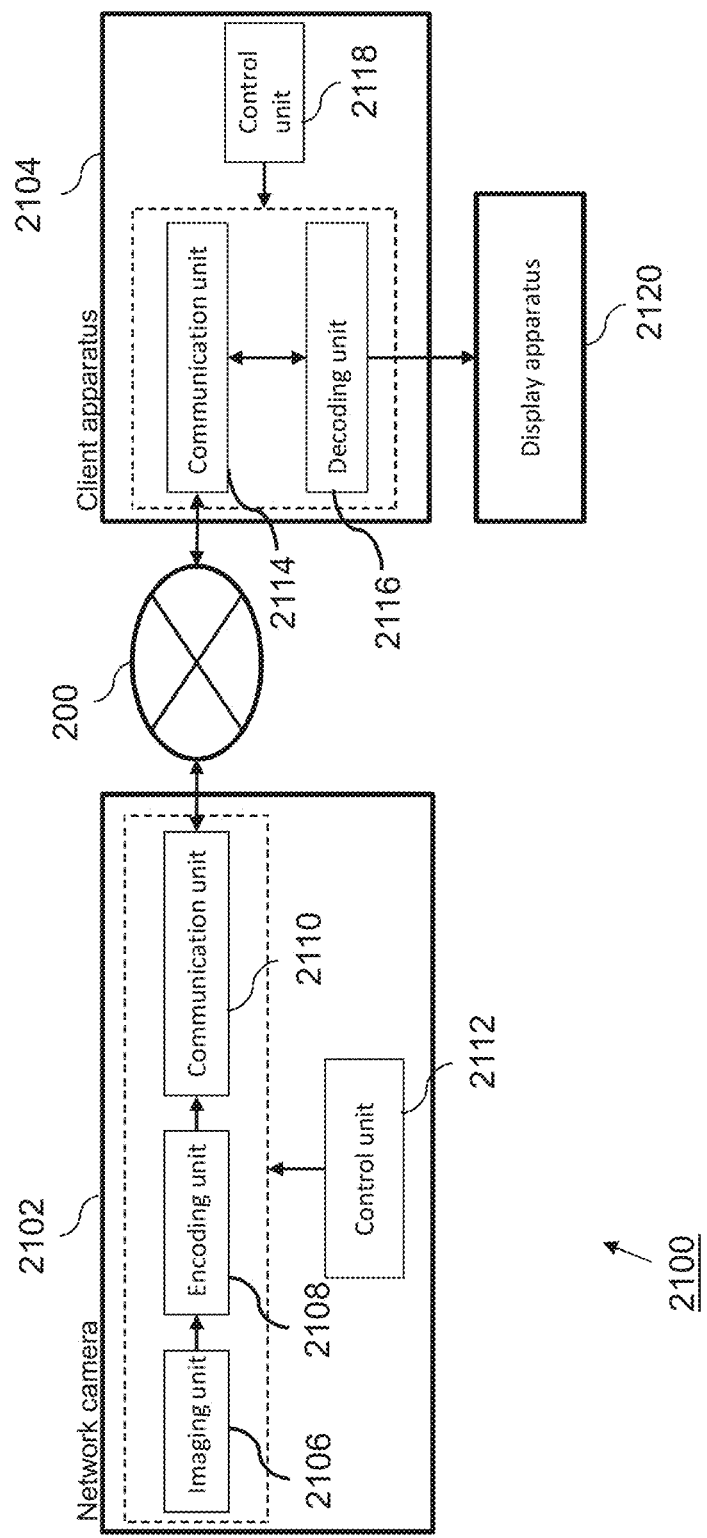
FIG. 9 is a diagram illustrating a network camera system.

FIG. 9 is a diagram illustrating a network camera system 2100 including a network camera 2102 and a client apparatus 2104.

The network camera 2102 includes an imaging unit 2106, an encoding unit 2108, a communication unit 2110, and a control unit 2112.

The network camera 2102 and the client apparatus 2104 are mutually connected to be able to communicate with each other via the network 200.

The imaging unit 2106 includes a lens and an image sensor (e.g., a charge coupled device (CCD) or a complementary metal oxide semiconductor (CMOS)), and captures an image of an object and generates image data based on the image. This image can be a still image or a video image.

The encoding unit 2108 encodes the image data by using said encoding methods described above.

The communication unit 2110 of the network camera 2102 transmits the encoded image data encoded by the encoding unit 2108 to the client apparatus 2104.

Further, the communication unit 2110 receives commands from client apparatus 2104. The commands include commands to set parameters for the encoding of the encoding unit 2108.

The control unit 2112 controls other units in the network camera 2102 in accordance with the commands received by the communication unit 2110.

The client apparatus 2104 includes a communication unit 2114, a decoding unit 2116, and a control unit 2118.

The communication unit 2114 of the client apparatus 2104 transmits the commands to the network camera 2102.

Further, the communication unit 2114 of the client apparatus 2104 receives the encoded image data from the network camera 2102.

The decoding unit 2116 decodes the encoded image data by using said decoding methods described above.

The control unit 2118 of the client apparatus 2104 controls other units in the client apparatus 2104 in accordance with the user operation or commands received by the communication unit 2114.

The control unit 2118 of the client apparatus 2104 controls a display apparatus 2120 so as to display an image decoded by the decoding unit 2116.

The control unit 2118 of the client apparatus 2104 also controls a display apparatus 2120 so as to display GUI (Graphical User Interface) to designate values of the parameters for the network camera 2102 includes the parameters for the encoding of the encoding unit 2108.

The control unit 2118 of the client apparatus 2104 also controls other units in the client apparatus 2104 in accordance with user operation input to the GUI displayed by the display apparatus 2120.

The control unit 2119 of the client apparatus 2104 controls the communication unit 2114 of the client apparatus 2104 so as to transmit the commands to the network camera 2102 which designate values of the parameters for the network camera 2102, in accordance with the user operation input to the GUI displayed by the display apparatus 2120.

Smart Phone

Figure 10:
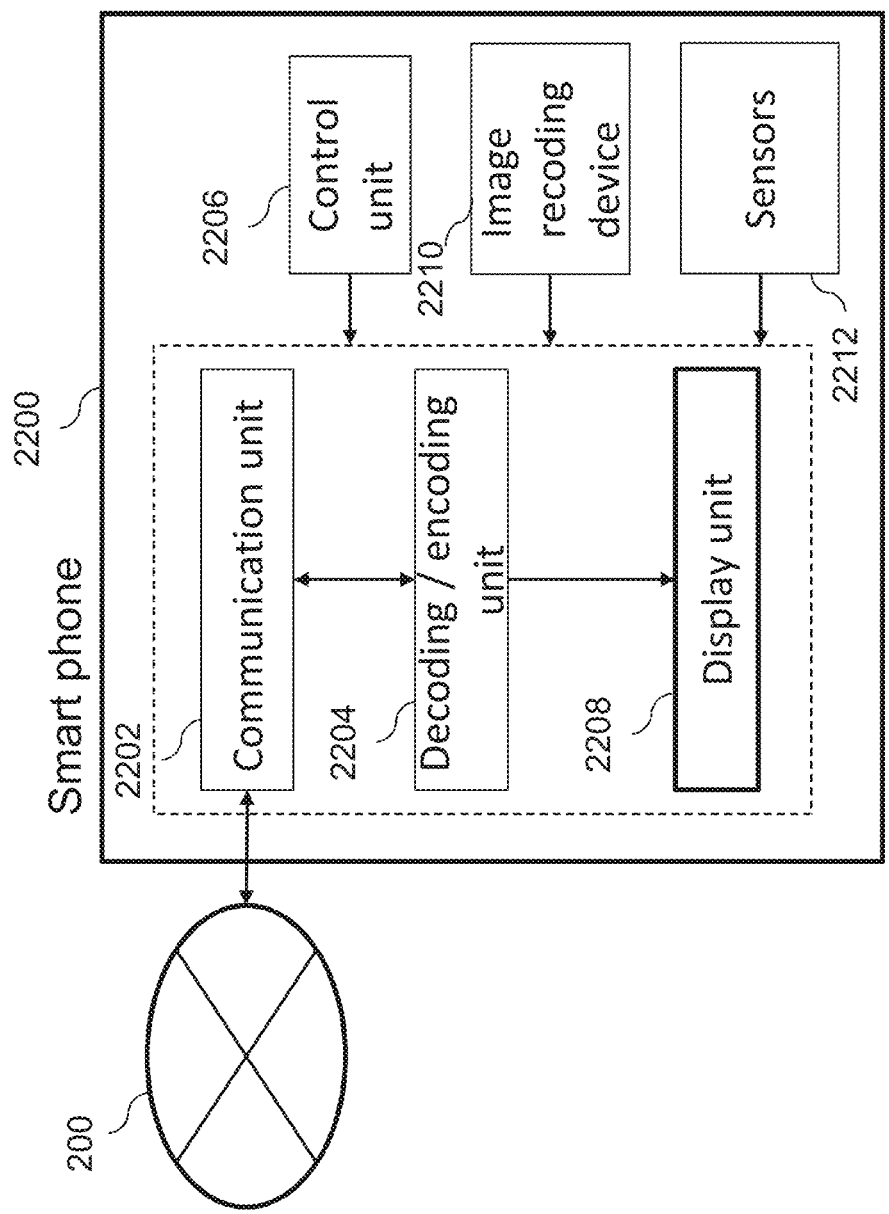
FIG. 10 is a diagram illustrating a smart phone.

FIG. 10 is a diagram illustrating a smart phone 2200.

The smart phone 2200 includes a communication unit 2202, a decoding unit 2204, a control unit 2206, display unit 2208, an image recording device 2210 and sensors 2212.

The communication unit 2202 receives the encoded image data via network 200.

The decoding unit 2204 decodes the encoded image data received by the communication unit 2202.

The decoding unit 2204 decodes the encoded image data by using said decoding methods described above.

The control unit 2206 controls other units in the smart phone 2200 in accordance with a user operation or commands received by the communication unit 2202.

For example, the control unit 2206 controls a display unit 2208 so as to display an image decoded by the decoding unit 2204.

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

Reference numerals appearing in the claims are by way of illustration only and shall have no limiting effect on the scope of the claims.

The invention claimed is:

1. A method of decoding a picture from a bitstream, wherein the picture comprises one or more slices, and wherein the bitstream comprises a picture header, and an adaptation parameter set, the method comprising:
 decoding, from the picture header, a first syntax element which is related to partitioning and is to be used for INTRA corresponding to a coding type of a slice, if:
 (a) a value of a partition constraints override flag, in the picture header, relating to partitioning is 1; and (b) a predetermined syntax element, having a value of 0, in the picture header indicates that all slices in the picture use INTRA; and decoding said one or more slices using said decoded first syntax element, wherein a second syntax element which is related to partitioning and is to be used for INTER, wherein INTER corresponds to a coding type of the slice, is capable of being decoded from the picture header depending on a value of the partition constraints override flag and a value of the predetermined syntax element, wherein even if the value of the partition constraints override flag is 1, the second syntax element is not decoded from the picture header if the predetermined syntax element, having the value of 0, in the picture header indicates that all slices in the picture use INTRA, and wherein the adaptation parameter set is capable of being located after the picture header in the bitstream and is capable of including information related to an adaptive loop filter.

2. The method according to claim 1, wherein when the partitioning override flag has a value of 1, the partition constraints override flag in the picture header indicates that parameters related to partitioning are present in the picture header.

3. The method according to claim 1, wherein a syntax element which is related to a delta QP and which is to be used for INTRA is capable of being decoded from the picture header.

4. The method according to claim 1, wherein the bitstream further comprises a slice header, wherein information corresponding to coding type of a slice is capable of being decoded from the slice header depending on a value of the predetermined syntax element, wherein the information is not decoded from the slice header if the predetermined syntax element in a picture header indicates that all slices in the picture use INTRA.

5. A method of encoding a picture into a bitstream, wherein the picture comprises one or more slices, and
wherein the bitstream comprises a picture header, and an adaptation parameter set, the method comprising:
encoding, into the picture header, a first syntax element which is related to partitioning and is to be used for INTRA corresponding to a coding type of a slice, if:
(a) a value of a partition constraints override flag, in the picture header, relating to partitioning is 1; and
(b) a predetermined syntax element, having a value of 0, in the picture header indicates that all slices in the picture use INTRA; and
encoding said one or more slices,
wherein a second syntax element which is related to partitioning and is to be used for INTER, wherein INTER corresponds to a coding type of the slice, is capable of being encoded into the picture header depending on a value of the partition constraints override flag and a value of the predetermined syntax element,
wherein even if the value of the partition constraints override flag is 1, the second syntax element is not encoded into the picture header if the predetermined syntax element, having the value of 0, in the picture header indicates that all slices in the picture use INTRA, and wherein the adaptation parameter set is capable of being located after the picture header in the bitstream and is capable of including information related to an adaptive loop filter.

6. A decoder adapted to decode a picture from a bitstream, wherein the picture comprises one or more slices, and wherein the bitstream comprises a picture header and an adaptation parameter set, the decoder comprising:
a decoding unit configured to:
decode, from the picture header, a first syntax element which is related to partitioning and is to be used for INTRA corresponding to a coding type of a slice, if:
(a) a value of a partition constraints override flag, in the picture header, relating to partitioning is 1; and
(b) a predetermined syntax element, having a value of 0, in the picture header indicates that all slices in the picture use INTRA; and
decode said one or more slices using said first decoded syntax element,
wherein a second syntax element which is related to partitioning and is to be used for INTER, wherein INTER corresponds to a coding type of the slice, is capable of being decoded from the picture header depending on a value of the partition constraints override flag and a value of the predetermined syntax element,
wherein even if the value of the partition constraints override flag is 1, the second syntax element is not decoded from the picture header if the predetermined syntax element, having the value of 0, in the picture header indicates that all slices in the picture use INTRA, and
wherein the adaptation parameter set is capable of being located after the picture header in the bitstream and is capable of including information related to an adaptive loop filter.

7. An encoder adapted to encode a picture into a bitstream, wherein the picture comprises one or more slices, and wherein the bitstream comprises a picture header and an adaptation parameter set, the encoder comprising:
an encoding unit configured to:
encode, into the picture header, a first syntax element which is related to partitioning and is to be used for INTRA corresponding to a coding type of a slice, if:
(a) a value of a partition constraints override flag, in the picture header, relating to partitioning is 1; and
(b) a predetermined syntax element, having a value of 0, in the picture header indicates that all slices in the picture use INTRA; and
encode said one or more slices,
wherein a second syntax element which is related to partitioning and is to be used for INTER, wherein INTER corresponds to a coding type of the slice, is capable of being encoded into the picture header depending on a value of the partition constraints override flag and a value of the predetermined syntax element,
wherein even if the value of the partition constraints override flag is 1, the second syntax element is not encoded into the picture header if the predetermined syntax element, having the value of 0, in the picture header indicates that all slices in the picture use INTRA, and
wherein the adaptation parameter set is capable of being located after the picture header in the bitstream and is capable of including information related to an adaptive loop filter.

8. A non-transitory computer readable medium storing a program for causing a computer to execute a method of decoding a picture from a bitstream, wherein the picture comprises one or more slices and wherein the bitstream comprises a picture header, and an adaptation parameter set, the method comprising:
- decoding from the picture header, a first syntax element which is related to partitioning and is to be used for INTRA corresponding to a coding type of a slice, if:
  - (a) a value of a partition constraints override flag, in the picture header, relating to partitioning is 1; and
  - (b) a predetermined syntax element, having a value of 0, in the picture header indicates that all slices in the picture use INTRA; and
- decoding said one or more slices using said first decoded syntax elements,
- wherein a second syntax element which is related to partitioning and is to be used for INTER, wherein INTER corresponds to a coding type of the slice, is capable of being decoded from the picture header depending on a value of the partition constraints override flag and a value of the predetermined syntax element,
- wherein even if the value of the partition constraints override flag is 1, the second syntax element is not decoded from the picture header if the predetermined syntax element, having the value of 0, in the picture header indicates that all slices in the picture use INTRA, and
- wherein the adaptation parameter set is capable of being located after the picture header in the bitstream and is capable of including information related to an adaptive loop filter.

9. A non-transitory computer readable storage medium storing a program for causing a computer to execute a method of encoding a picture into a bitstream, wherein the picture comprises one or more slices, and wherein the bitstream comprises a picture header, and an adaptation parameter set, the method comprising:
- encoding, into the picture header, a first syntax element which is related to partitioning and is to be used for INTRA corresponding to a coding type of a slice, if:
  - (a) a value of a partition constraints override flag, in the picture header, relating to partitioning is 1; and
  - (b) a predetermined syntax element, having a value of 0, in the picture header indicates that all slices in the picture use INTRA; and
- encoding said one or more slices using said first syntax element,
- wherein a second syntax element which is related to partitioning and is to be used for INTER, wherein INTER corresponds to a coding type of the slice, is capable of being encoded into the picture header depending on a value of the partition constraints override flag and a value of the predetermined syntax element,
- wherein even if the value of the partition constraints override flag is 1, the second syntax element is not encoded into the picture header if the predetermined syntax element, having the value of 0, in the picture header indicates that all slices in the picture use INTRA, and
- wherein the adaptation parameter set is capable of being located after the picture header in the bitstream and is capable of including information related to an adaptive loop filter.

* * * * *